United States Patent
Davis et al.

(10) Patent No.: US 12,405,059 B2
(45) Date of Patent: Sep. 2, 2025

(54) SYSTEMS AND METHODS FOR PLANT DEHYDRATION

(71) Applicant: Shawin Technology Group, Inc., Newport Beach, CA (US)

(72) Inventors: Brian M. Davis, Newport Beach, CA (US); Jorge N. Harb Kallab, Newport Beach, CA (US); Benjamin J. Kalinowski, Newton, NH (US); Jeffrey D. McPhee, Ashland, OR (US)

(73) Assignee: Shawin Technology Group Inc., Newport Beach, CA (US)

( * ) Notice: Subject to any disclaimer, the term of this patent is extended or adjusted under 35 U.S.C. 154(b) by 677 days.

(21) Appl. No.: 17/877,663

(22) Filed: Jul. 29, 2022

(65) Prior Publication Data

US 2024/0035749 A1    Feb. 1, 2024

(51) Int. Cl.
| | |
|---|---|
| F26B 25/06 | (2006.01) |
| A23N 12/08 | (2006.01) |
| F26B 9/10 | (2006.01) |
| F26B 21/00 | (2006.01) |
| F26B 25/00 | (2006.01) |

(52) U.S. Cl.
CPC .............. F26B 25/063 (2013.01); F26B 9/10 (2013.01); F26B 21/004 (2013.01); F26B 25/002 (2013.01); A23N 12/08 (2013.01)

(58) Field of Classification Search
CPC ........ F26B 25/063; F26B 9/10; F26B 21/004; F26B 25/002; A23N 12/08
USPC .......................................................... 34/417
See application file for complete search history.

(56) References Cited

U.S. PATENT DOCUMENTS

| | | | | |
|---|---|---|---|---|
| 3,456,357 | A | * | 7/1969 | Griffith ................. F26B 25/009 34/493 |
| 5,546,678 | A | * | 8/1996 | Dhaemers ............... F26B 21/02 34/224 |
| 6,988,325 | B2 | * | 1/2006 | Philippe ................ F26B 21/028 34/209 |

(Continued)

FOREIGN PATENT DOCUMENTS

| | | | | |
|---|---|---|---|---|
| GB | 2595759 | A | * 12/2021 | .............. B01D 39/04 |
| JP | 2011084833 | A | * 4/2011 | |

(Continued)

*Primary Examiner* — Stephen M Gravini
(74) *Attorney, Agent, or Firm* — Shalchi Law P.C.; Ali Shalchi, Esq.

(57) ABSTRACT

A system for dehydration of organic material comprises a housing structure having an interior chamber, a supply duct, a dual trunk structure, a dry air intake, a central recirculation duct, and a plurality of side recirculation ducts. The side recirculation ducts each have a return plenum extending downward from a top recirculation duct and are configured to recirculate interior air contained in the chamber. The interior air enters the side recirculation ducts through the return plenums and is pushed upward and outward through the top recirculation ducts and back into the interior chamber. The interior chamber has a plurality of exhaust vents positioned in the upper region of its walls. A plurality of portable platforms positioned inside the interior chamber are configured to hold the organic material. The floor of the housing structure can include a plurality of tracks for loading, unloading and positioning the portable platforms.

20 Claims, 13 Drawing Sheets

(56) References Cited

U.S. PATENT DOCUMENTS

| | | | | |
|---|---|---|---|---|
| 7,179,160 | B2 * | 2/2007 | Hulin | A22C 29/005 |
| | | | | 99/535 |
| 8,661,705 | B2 * | 3/2014 | Hackl | B29C 48/287 |
| | | | | 524/498 |
| 10,933,343 | B2 * | 3/2021 | Szczap | B01J 2/04 |
| 11,656,027 | B2 * | 5/2023 | Mondeik | F26B 25/12 |
| | | | | 34/168 |
| 11,712,638 | B2 * | 8/2023 | Szczap | F26B 21/04 |
| | | | | 159/48.1 |
| 12,150,467 | B2 * | 11/2024 | Blanc | F26B 21/04 |
| 2022/0211068 | A1 * | 7/2022 | Rubin | A23G 1/003 |
| 2024/0035749 | A1 * | 2/2024 | Davis | F26B 9/10 |
| 2024/0065284 | A1 * | 2/2024 | Rubin | A23G 1/002 |
| 2025/0089689 | A1 * | 3/2025 | King | A01K 63/045 |

FOREIGN PATENT DOCUMENTS

| | | | | |
|---|---|---|---|---|
| KR | 101199875 | B1 * | 11/2012 | A23L 19/09 |
| WO | WO-2020254027 | A1 * | 12/2020 | F26B 25/002 |

* cited by examiner

SYSTEMS AND METHODS FOR PLANT DEHYDRATION

FIELD OF THE INVENTION

This disclosure relates to the field of dehydration of organic materials.

BACKGROUND

It is often desired to prepare organic materials for consumption, storage, and/or transport by removing moisture from them. The drying of meats, fruits, flowers, and other goods has a long history in preservation and processing of food and plants for various applications. Cannabaceae or the Hemp family is one such organic material that is dehydrated for commercial purposes. There are several conventional methods for dehydrating cannabis or hemp that work on a small scale, but have disadvantages when used at large scale. Though drying methods vary, the general goal is to remove sufficient water or other solvent from the organic material while doing the least amount of harm to the organic material.

Traditional drying methods often utilize high air temperatures (heat) to draw out moisture from goods, taking advantage of the higher saturation vapor pressure, (or SVP) of the air when heated. Ambient air with a higher SVP is capable of holding more moisture, therefore it is a condition that helps to dehydrate goods. However, the use of high air temperatures can damage the organic material's desirable properties (e.g., flavor) and requires increased energy consumption. Moreover, because dried goods are often sold by weight, the more bounded water that is removed results in less profit for the farmer/producer. Another common method in the cannabis industry is hang drying, whereby a constant temperature of 60-65° F. is applied with relative humidity of 50-55%. The problem with maintaining a high humidity is time, as there is a high risk for microbial growth (e.g., mold). Hang drying at large scale requires a relatively large amount of space, labor, and time. It also creates challenges in maintaining uniform humidity in tall storage units, and the resulting imbalance results in inconsistent product quality. Another disadvantage to hang drying is the drying of the stem. A different method is freeze drying via lyophilization. While efficient, freeze drying requires expensive equipment, and lyophilization does not differentiate between free and bonded water which results in a lighter weight product (and thus lower commercial value).

There is a need in the art for systematic and controlled means for efficient dehydration at scale that provides lower processing costs and prevents microbial growth generated by trapped water inside the organic material. Such means would provide more optimal management of relevant parameters such as space, temperature, humidity, and pressure.

SUMMARY

Systems and methods for dehydration of organic material are provided. In one embodiment, the system comprises a housing structure having an interior chamber, a supply duct, a dual trunk structure, a dry air intake, a central recirculation duct, and a plurality of side recirculation ducts. The side recirculation ducts each have a return plenum extending downward from a top recirculation duct and are configured to recirculate interior air contained in the chamber. The interior air enters the side recirculation ducts through the return plenums and is pushed upward and outward through the top recirculation ducts and back into the interior chamber. The interior chamber has a plurality of exhaust vents positioned in the upper region of its walls. A plurality of portable platforms positioned inside the interior chamber are configured to hold the organic material. In another embodiment, the floor of the housing structure is a shipping container that can include a plurality of tracks for loading, unloading and positioning the portable platforms.

In one embodiment, inflow of dry air into the drying chamber provides a temperature of below 70 degrees Fahrenheit and a relative humidity level of less than 30% in the air surrounding the hemp plants, and the relative humidity level results in a vapor pressure deficit in the air that causes free water to escape from the hemp plants while leaving bound water intact, the escaped free water mixing with the dry air in the drying chamber.

In one embodiment, a method of dehydrating plants comprises the steps of sanitizing ventilated trays, debucking cannabaceae colas, sanitizing the colas, placing the colas onto the trays, stacking the trays, placing the stacks onto pallets, sanitizing a drying chamber, drying the chamber, activating fan systems, and checking temperature and relative humidity sensors for proper functioning and placement. The method further comprises adjusting temperature and relative humidity within the drying chamber to 60 degrees Fahrenheit and 20%, respectively, transporting the loaded pallets into the drying chamber, closing the doors to the drying chamber to seal the system, introducing a continuous supply of dry intake air into the drying chamber using a desiccant unit and monitoring the sensors. The method further comprises measuring a relative humidity level of 35% within the drying chamber, measuring the water activity levels of small and large colas, and determining a time frame in which the levels will reach 0.45 and 0.25, respectively, continuing drying, and then measuring a water activity level of 0.25 in large colas. The supply of dry air is then shut off and the fan systems are left on for 4 more hours, removing the loaded pallets of dry colas from the drying chamber, emptying the colas from the trays into plastic bags and sealing the bags in boxes, tumbling and checking the colas. If moisture has returned within the bag, the placing the colas back in the drying chamber; and if drying is complete, restarting the sanitization process.

In one embodiment, a dehydration system for organic material comprises a housing structure having an interior chamber formed by front, back, right-side and left-side walls, a floor, each having an interior surface that faces the chamber and an exterior surface, and wherein each of the walls has an upper region. The system further comprises a supply duct having a vertical distributive duct, a dual trunk structure with upper and lower trunks, and a dry air intake, wherein the upper and lower trunks extend away from the vertical distributive duct and the interior surface of the back wall and toward the interior surface of the front wall, wherein the dry air intake extends away from the vertical distributive duct and away from the exterior surface of the back wall, wherein the supply duct is configured to force dry air into the interior chamber of the housing structure, wherein the dry air enters the supply duct through the dry air intake, wherein the vertical distributive duct is configured to distribute the dry air to the upper and lower trunks, and wherein the dual trunk structure is configured to release the dry air into the interior chamber of the housing structure.

The system also includes a central recirculation duct, a central trunk with a mixed air intake extending from it, wherein the central recirculation duct is configured to recirculate interior air contained in the chamber, wherein the interior air enters into the central trunk through the mixed air intake, and wherein the central trunk is configured to release the interior air back into the interior chamber. Also included are a plurality of side recirculation ducts each comprising a return plenum extending downward from a top recirculation duct, wherein the side recirculation ducts are positioned opposite the dual trunk structure and central trunk, wherein the side recirculation ducts are configured to recirculate interior air contained in the chamber, and wherein the interior air enters into the side recirculation ducts through the return plenums and is pushed upward and outward through the top recirculation ducts and back into the interior chamber. A plurality of portable platforms positioned inside of the interior chamber and are configured to hold organic material.

DETAILED DESCRIPTION

Figure 1:
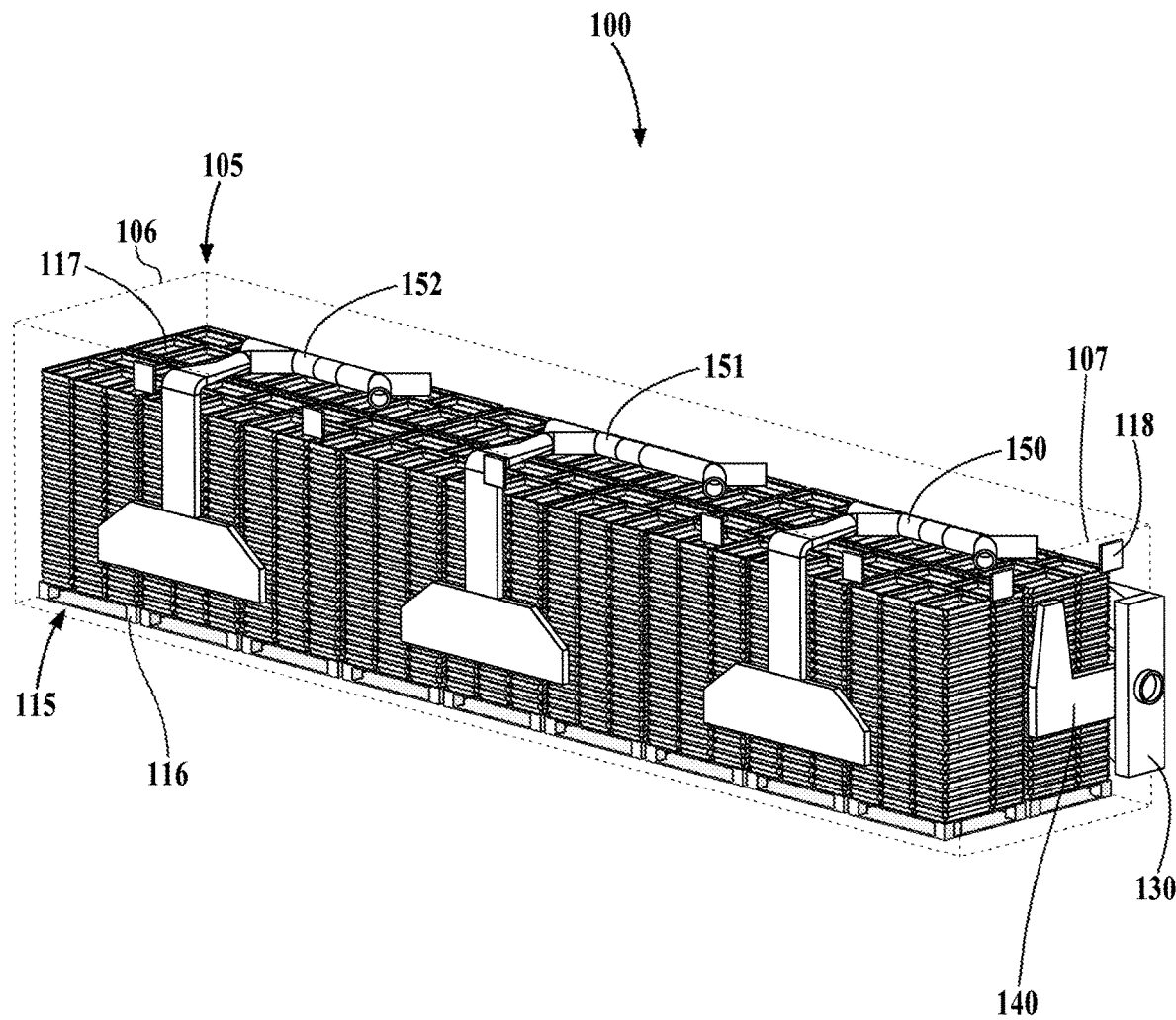
FIG. 1 illustrates a top right perspective view of a plant dehydration system in accordance with an embodiment of the present disclosure.

In the following discussion, numerous specific details are set forth to provide a thorough understanding of the disclosed subject matter. However, those skilled in the art will appreciate that the present disclosed subject matter may be practiced without such specific details. In other instances, well-known elements, processes or techniques have been briefly mentioned and not elaborated on in order not to obscure the disclosed subject matter in unnecessary detail and description. Moreover, specific details and the like may have been omitted inasmuch as such details are not deemed necessary to obtain a complete understanding of the disclosed subject matter, and are considered to be within the understanding of persons having ordinary skill in the relevant art.

The disclosed subject matter includes systems and methods for the dehydration of organic materials, especially plants, including fruits and vegetables, with some embodiments providing an emphasis on the hemp family cannabaceae. The disclosed dehydration system and method improves upon the art by preserving the vital qualities of an item (such as flavor and texture) throughout the drying process, while doing so expeditiously and with better energy efficiency. Moreover, most of the free water is removed from within the dried item, leaving most of the bound water untouched. This maximizes dryness while maintaining a higher item weight, which benefits vendors in almost all produce industries, since the final price of the dried item is dictated by its weight.

The disclosed system provides a unique approach for curing organic materials into shelf-stable goods by implementing a balanced overall environment. The system achieves ideal drying conditions for organic goods or items by providing a controlled, low temperature environment with low relative humidity that generates low air pressure around the items in order to remove free water from them. To accomplish this, the environment further provides an enclosed and insulated interior area, or drying chamber, into which a controlled flow of exterior dry air is introduced, and within which an initial vapor pressure deficit, or VPD, is created. Targeting the drying chamber's VPD value is a unique feature of the present disclosure. It provides a high scale, more indirect, scientifically researched approach whereby a vendor or preparer can dry their goods without the use of harsh high temperature conditions, or ineffectual and time-consuming hanging methods that can promote microbial growth. A VPD value greater than one can cause more water to leave the item, causing its dehydration. A VPD value of 1.4 or higher creates an ideal low-pressure system and can cause free water to leave the organic material, while leaving bounded water within it, as vapor pressure does not affect the bounded water. The system can achieve an optimal range of VPD values of between 1.4 and 1.7 at temperatures below 70 degrees Fahrenheit by pushing the relative humidity levels down below 30% as a consequence of introducing the current of dry air into the region occupied by the organic items. The lowered relative humidity creates more space for moisture in the ambient air, allowing it to absorb more water from the organic materials. The low temperature condition created within the closed, optimally pressurized system makes it much easier to avoid a given item's glass-transition temperature ($T_g$), or point at which a material alters state, going from a glass-like, rigid solid to a more flexible rubbery compound. Thus, damage to the items is prevented, while consuming much less energy throughout the drying period. Different products may require different times and temperatures for optimal curing.

The disclosed system implements the above environmental conditions in order to affect certain aspects of the organic items within the drying chamber, including their water activity, or $a_W$, levels. Water activity is a measurement of the free water available in a given sample of organic material, and thus the amount of water that can leave the item in this case. Regarding food items, $a_W$ refers to the ratio between the vapor pressure of the food itself, when in a completely undisturbed balance with the surrounding air media, and the vapor pressure of distilled water under identical conditions.

Water activity is measured from 0 to 1, 1 being the value for distilled water. The present disclosure provides a system that promotes water activity within an ideal range wherein microbial growth is safely deterred, while an optimal product value is maintained for a vendor. The above environmental conditions also make use of the second law of fluid dynamics and Bernoulli's principle, which states that slower moving fluids create greater pressure (or force) than faster moving fluids. Since the wet organic item initially possesses a self-contained "high pressure system" relative to the abovementioned low-pressure region surrounding it, the free water contained within can freely flow out of the item and permeate the chamber. In this way, a substantial amount, more than 80%, of the organic material's free water is removed, while its bound water remains substantially intact, with more than 80% of it being preserved.

Free water inside of the item evaporates in stages, as if draining internal compartments. In one example, the disclosed system and method can be used to dry hemp flowers, including bucked, or stem-picked cannabaceae colas—the tightly woven budding portion of a female cannabis plant. In such a flower, which acts like a sponge wherein water can freely move, free water on its surface becomes a "low pressure system" that draws water out from the higher-pressure interior and onto the surface. This provides the optimal pressure balance for proper curing. Thereafter, the released free water integrates or mixes with air currents in the drying chamber.

An overall goal of the system is to strategically create air circulation around the organic material in a way that best facilitates a balanced distribution of dry air and recirculated air within the insulated system, with dryer air taking the longest path possible through the drying chamber so that it better permeates the desired drying area, while the most humid air takes the shortest path, quickly rising to the top of the environment. Exhaust vents with dampers are provided near the top, allowing a route of escape for the humid air. These vents are under an optimal level of tension, contributing to a minimal pressure buildup within the interior environment as a whole, while releasing an ideal quantity of humid air from it.

Referring to FIG. 1, a top right perspective view shows a plant dehydration system 100 in accordance with an embodiment of the present disclosure. In subsequent discussions concerning dehydration, references to plants and further specified types of plants should be seen as non-limiting in nature. Terms such as organic material or items, goods, products, plants, fruits, vegetables, flowers, hemp, cannabis, hops, mushrooms and the like may be used interchangeably for high level discussions regarding the presently disclosed systems and methods for controlled dehydration. An exemplary embodiment of a plant dehydration system 100 further comprises a housing structure 105 with front wall 106 and back wall 107. In most of the following drawings, the housing structure 105 is indicated with dashed lines in order to show vital system components, while still showing the essential contours and dimensions of the housing structure itself. In the following description, all directional references made with respect to the system 100 are from the perspective of a viewer or operator who is outside of it and directly facing the front wall 106. From this position, an operator can access the interior of the housing through doors found on the front wall 106 in order to conduct activities associated with the dehydration of goods. In an exemplary embodiment of the present invention, the housing structure 105 is a large, modified shipping container with a long rectangular body and six walls or sides. It measures 40 feet in length, 8.5 feet in width, and 9.5 feet in height. The container is insulated so that there is zero transfer of heat between the exterior and interior of the container. Within the interior drying chamber of this housing 105, an operator strategically places plant drying stacks 115 in a way that maximizes space. Each plant drying stack 115 further comprises a portable platform 116 upon which sits stacked drying trays 117. An exemplary embodiment of a stack 115 utilizes a pallet or skid as the portable platform 116, and has eighteen of such platforms placed into two lengthwise rows of nine pallets each, a single stack ideally measuring 40 inches wide, 48 inches deep, and 84 inches high overall. The drying trays 117 in such an embodiment each measure 24 inches in length, 16 inches in width and 4 inches in height, and are stacked in levels of five trays each, with as much as twenty-two levels per stack 115. The drying chamber can be filled with less or more drying trays, stacked in different ways if needed.

Also found on the housing structure 105 are exhaust vents 118, which are essentially small windows running through two of the housing walls. These vents are under tension, providing a minimally pressurized drying chamber. As dry air is pumped into the drying chamber, the exhaust vents provide a gradual exit for the displaced humid air that builds up in a top region of the housing 105, near the ceiling (see ceiling 409 of FIG. 4). The vents 118 are located high up on the back wall 107 and right wall (see right-side wall 211 of FIG. 2). In an exemplary embodiment, five vents line the right-side wall, while two vents line the back wall 107. Additionally, the exhaust vents 118 ideally utilize barometric relief dampers as a means of creating tension, and thus pressure within the chamber. Some embodiments may utilize string louvers, while others may have mechanical louvers installed for greater precision.

Nearly all components of the dehydration system 100 are located within the walls of the housing structure 105. A substantial portion of the system 100 includes an assembly of ductwork that includes fan systems. A lengthwise supply duct subassembly 130 is mounted on the back wall 107 of the housing structure 105, with a small portion of it protruding through the back wall and sitting outside of the housing. A substantial portion of the lengthwise supply duct subassembly 130 runs along an interior left surface of the housing 105 that is not visible or indicated in the current drawing (see left side wall 210 of FIG. 2). Low temperature dry air is introduced and pushed into the interior of the housing 105 via elements found on and within the supply duct subassembly 130. This dry air is delivered toward the left side of the stacks 115. In an exemplary embodiment, this dry air is pumped in at an average of 1700 cubic feet per minute, or CFM, within a 40-foot-long housing structure 105 in order to exchange the air in the drying chamber at least thirty times per hour. It should again be noted that a larger main goal of the presently disclosed system 100 is to provide an optimized technique for creating a vapor pressure deficit, rather than use air velocity alone to achieve a desired result. The dry air ideally has a VPD value of approximately 1.7, and mixes with more humid air in the drying chamber. If the unit will be used in different locations, to ease transportation, the supply duct subassembly 130 can also be placed inside of the drying chamber by adding an internal wall to hold a central recirculation duct 140.

The system 100 further comprises a group of redistributive duct work that helps to redirect the mixed interior air, including recirculation subassemblies 150-152. These three subassemblies of ductwork are mounted in even succession along an interior right surface of the housing 105, starting from near the back wall 107 to near the front wall 106, respectively. Each subassembly corresponds to a group of six stacks 115, flanking their right side in close proximity and extending overhead above their top region at a slightly larger distance away. The recirculation subassemblies 150-152 serve as intake ducts which draw air from the stagnant right side of the stacks 115, mix it with more humid air from the top interior region of the housing 105, and push it along the length of the housing. This results in air moving circularly around the drying chamber, horizontally through the stacks, and from the front wall 106 to the back wall 107. Mounted nearly centrally on the back wall 107 sits the central recirculation duct 140 which intercepts and intakes the aforementioned mixed interior air moving through an upper region and toward the back wall 107. The central recirculation duct 140 is nested between the lengthwise ducts of the supply duct subassembly 130 (and fully contained within the housing 105) via its own lengthwise air delivery duct (see central trunk 741 of FIG. 7) running along the housing's left side, and has an angled intake portion (see mixed air intake 443 of FIG. 4) that points upward toward the ceiling of the housing, as seen in the current drawing. From this height, in the housing's back region (which tends to be an even higher humidity area), the central recirculation duct 140 pulls in mixed air and delivers it back to the stacks 115 via its lengthwise duct, thereby completing the loop of back-to-front airflow and assisting with side-to-side circulation. An exemplary embodiment places the intake portion of this central duct 140 at least 3 inches below the exhaust vents 118, so that the intake portion sits at an ideal location for pulling in mixed air, while the most humid air naturally moves even higher and escapes through the exhaust vents following successful pressurization of the drying chamber.

Figure 2:
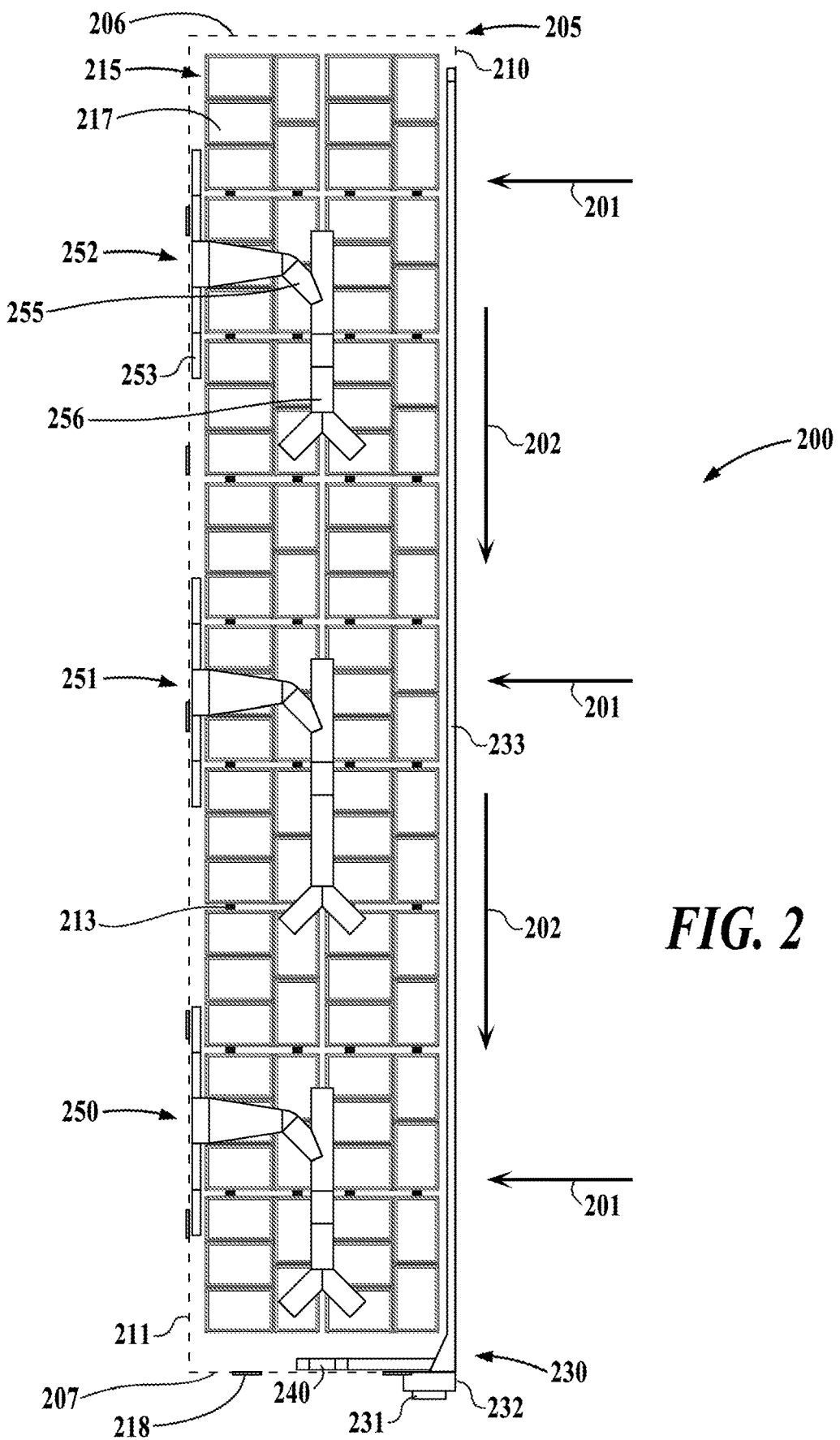
FIG. 2 illustrates a top view of a plant dehydration system in accordance with an embodiment of the present disclosure.

Referring to FIG. 2, a top view shows a plant dehydration system 200 in accordance with an embodiment of the present disclosure. The top level of the plant drying stacks 215 is shown in greater detail. This overhead view highlights the optimal loading technique used to fill the stacks 215 with trays 217 that hold organic materials to be dried. The exemplary dimensions of each of the five trays 217 per level allow them to be oriented in a way that maximizes space on the abovementioned portable platform. As shown in the current view, each level comprises a set of three trays 217 oriented with their lengthwise edges running perpendicular to the central axis of the housing 205, and a set of two trays rotated 90 degrees counterclockwise from the adjacent set. The trays 217 in the set of three are placed edge-to-edge along their lengthwise edges, while the trays in the set of two are placed edge-to-edge along their widthwise edges. The two sets meet at widthwise edges and lengthwise edges of a common side for each of the trays in the set of three and set of two, respectively. In this configuration, the free edges of all the trays 217 in the level generally sit flush with one another, with the lower levels, and with the perimeter edge of the portable platform. Loading tracks 213 are an additional feature of the housing structure 205, and can be found on the floor (see floor 308 of FIG. 3) facing the interior chamber of the housing, beneath the portable platforms and engaging with them. The tracks 213 comprise two sets of two rails each. In the exemplary embodiment shown, the loading tracks 213 allow stacked pallets to be loaded in by pushing them into the housing or shipping container along the tracks, positioning them along the length of the container and maintaining that position during transport of the container, and unloading them from the container by pulling them back out along the tracks, all in a safe and efficient manner. In this way, the properly sized stacks 215 fit into the housing structure 205 in an organized way that requires no measurement, placing them in predetermined positions along each of the two sets of rails with proper spacing relative to other stacks and to the interior chamber. The tracks 213 help to prevent both unwanted lateral and lengthwise movement of the stacks 215 within the drying chamber. The above embodiment provides loading tracks with a height of about 1.5 inches.

The lengthwise supply duct subassembly 230 further comprises a vertical distributive duct 232—the previously mentioned rectangular portion which sits on the outside of the housing structure 205. The vertical distributive duct 232 has a cylindrical dry air intake 231 protruding perpendicularly away from its central region, in a direction away from the housing structure 205. The vertical distributive duct 232 accepts dry air from the intake 231 and channels it into a dual trunk structure 233 running along nearly the entire length of the left-side wall 210—sitting in very close proximity to a lengthwise portion of the wall's inner surface, and being wholly situated within the drying chamber. Dry air is pumped into the chamber via slots (see air delivery slots 321 of FIG. 3) running through and along the length of the body of the dual trunk structure 233. The dry air thus moves from the interior left-side wall 210 toward the interior right-side wall 211, passing through the drying stacks 215 along the way and absorbing moisture from the wet organic material. Dry air motion arrows 201 indicates this air movement, which generally occurs along the entire length of the housing structure 205.

Also highlighted in the overhead view is the modular nature of some of the redistributive ductwork, in combination with groups of stacks 215. In particular, the three recirculation subassemblies 250-252, each further comprising an elbow stack duct 255, side return plenum 253, and top recirculation duct 256 that lies centrally along a lengthwise axis of the housing structure 205, are independently operable and thus can be installed into a plurality of larger or smaller scale dehydration configurations. In the exemplary embodiment shown, the top recirculation duct 256 is connected to the side return plenum 253 via the elbow stack duct 255, which angularly extends out approximately 14 inches from a right side of the top duct 256 at approximately 45 degrees counterclockwise, then bends at an elbow and extends out approximately 30 inches perpendicularly toward the side plenum 253, finally reaching down to connect with it via a vertical stack duct that is approximately 44 inches in height. The stack duct widens to about 16 inches at the point of connection between it and the side return plenum 253. Air is sucked into the recirculation subassemblies 250-252 via the plenum 253, traveling upward through the stack then leftward into the top recirculation duct 256, exiting through a symmetrical wye-shaped duct (see wye discharge 358 of FIG. 3) and traveling toward the back wall 207. Mixed air motion arrows 202 indicate this current of air. The subassemblies 250-252 can be mounted to the right-side wall 211 and/or mounted or suspended from the ceiling of the housing 205 via means practiced in the art. In the current exemplary embodiment depicted, three subassemblies 250-252 are ideal for a housing structure 205 of the size depicted, and are installed in even succession from the back wall 207 to front wall 206, respectively, with their side return plenums 253 being the referential component for equally spacing the subassemblies. Each of the functionally identical subassemblies 250-252 corresponds with a set of six plant drying stacks 215. When considering these stacks in three widthwise rows of two stacks each, each subassembly's side return plenum 253 lies centrally with respect to the middle row of each group of six stacks 215. In other examples of smaller scale configuration, using this modular feature, an operator can install one or two modular units (each unit comprising a recirculation subassembly with six stacks) into shipping containers of shorter length (e.g., 30 feet or 20 feet), adjusting the CFM of dry air flow proportionally.

The inlet for the central recirculation duct 240 is centrally located upon an interior surface of the back wall 207 so that it is nearly directly in line with the top recirculation ducts 256 of the recirculation subassemblies 250-252, being a few inches lower in order to capture the ideal mixture of humid and dry air emanating from the ducts overhead. The most humid air always travels upward and outward through the exhaust vents 218, bypassing the central recirculation duct 240. Through the right-side wall 211, the exemplary embodiment provides five vents 218, including one that sits halfway along the lengthwise axis of the housing 205, and two sets of two vents each that are positioned substantially nearer to the front and back walls 206 and 207, respectively. Through the back wall 207, a set of two vents flank the above-mentioned inlet for the central recirculation duct 240, a few inches away from both it and the edges of the back wall—laterally speaking. All vents sit at the same height on the housing 205. Overall, the above-mentioned plurality of air currents promotes a circulative system of airflow within the drying chamber, wherein recycled mixed air continuously recirculates around the drying stacks 215 at an ideal rate that properly removes free water from the organic material—without sacrificing the quality of the product.

Figure 3:
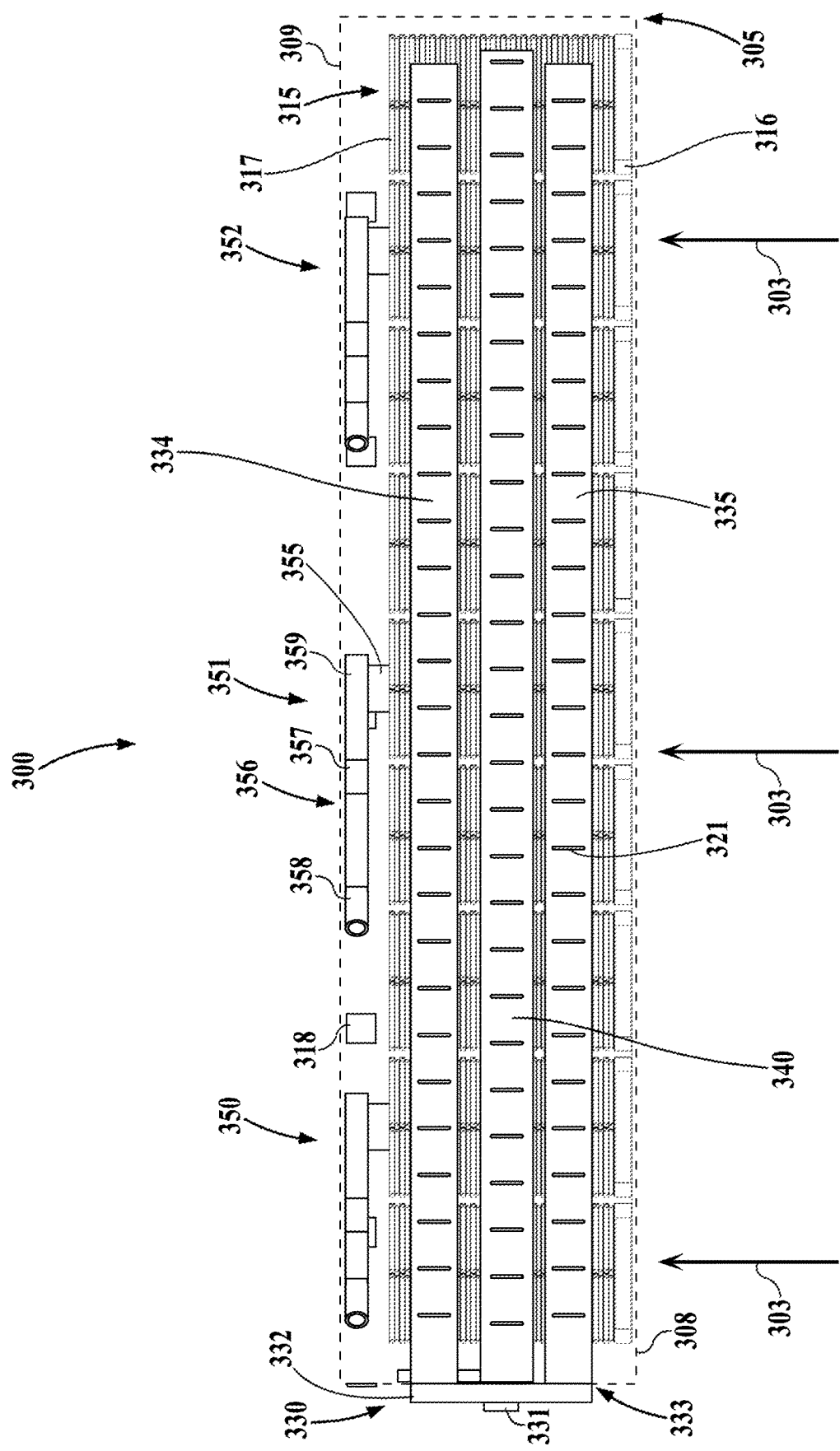
FIG. 3 illustrates a left-side view of a plant dehydration system in accordance with an embodiment of the present disclosure.

Referring to FIG. 3, a left-side view shows a plant dehydration system 300 in accordance with an embodiment of the present disclosure. In this view, the height-wise spatial relationships of system components found within the housing structure 305, with floor 308 and ceiling 309, are better illustrated. Recirculation subassemblies 350-352 have top surfaces that lie a negligible distance away from the ceiling 309 of the housing structure. Also seen (though largely obscured by the recirculation subassemblies 350-352) in the upper region are the five exhaust vents 318 located on the right-side wall of the housing. One of the sets of two back-end vents is visible in the view. The vents 318 and top recirculation ducts 356 are both situated a few inches above the topmost level of drying trays 317. An exemplary embodiment provides twenty-two levels of trays stacked upon a portable platform 316, a pallet or skid more specifically, which makes contact with an interior surface of the floor 308. A left profile view of the sets of two trays 317 is shown, highlighting their lengthwise edges. The three-tray sets completing each full set of five per level are obscured in this view. Humid air motion arrows 303 indicate the upward movement of the most humid air toward the ceiling 309 and exhaust vents 318.

The top recirculation duct 356 has a long cylindrical body that further comprises a singular inlet portion 359, a fan portion 357, and a symmetrical wye discharge portion 358. The previously mentioned elbow stack duct 355 is largely obscured by the plant drying stacks 315 in this view, but the view still helps to illustrate the central location of each stack duct 355 per modular segment of six plant drying stacks. Each of the recirculation subassemblies 350-352 are functionally identical, with the only structural difference among them being found on the middle subassembly 351, which has a wye discharge 358 with longer proximal trunk portion, forming an overall wye structure that is approximately double in length as compared with the back and front recirculation subassemblies 350 and 352, respectively.

The current view also highlights all three lengthwise ducts extending from both the supply duct subassembly 330 and the central recirculation duct 340. The supply duct subassembly 330, with vertical distributive duct 332, dry air intake 331, and dual trunk structure 333, further comprises an upper trunk 334 and lower trunk 335. In an exemplary embodiment, both trunks 334 and 335 have a height of about 16 inches, and extend away from the back wall of the housing 305 by a distance of about 452 inches. The lengthwise duct (see central trunk 741 of FIG. 7) of the central recirculation duct 340 is slightly larger than those of the dual trunk structure 333, and in an exemplary embodiment it has a height of about 18 inches, while it extends away from the back wall of the housing 305 by a distance of about 456 inches. All three lengthwise trunk ducts have air delivery slots 321 running through them widthwise. It is via these slots that dry air, taken in via the supply intake 331, is pumped into the drying chamber continuously throughout the initial drying stages. In one embodiment, the rate is within the range of 1,300 to 1,650 CFM and is ideally up to 1,700 CFM.

Figure 4:
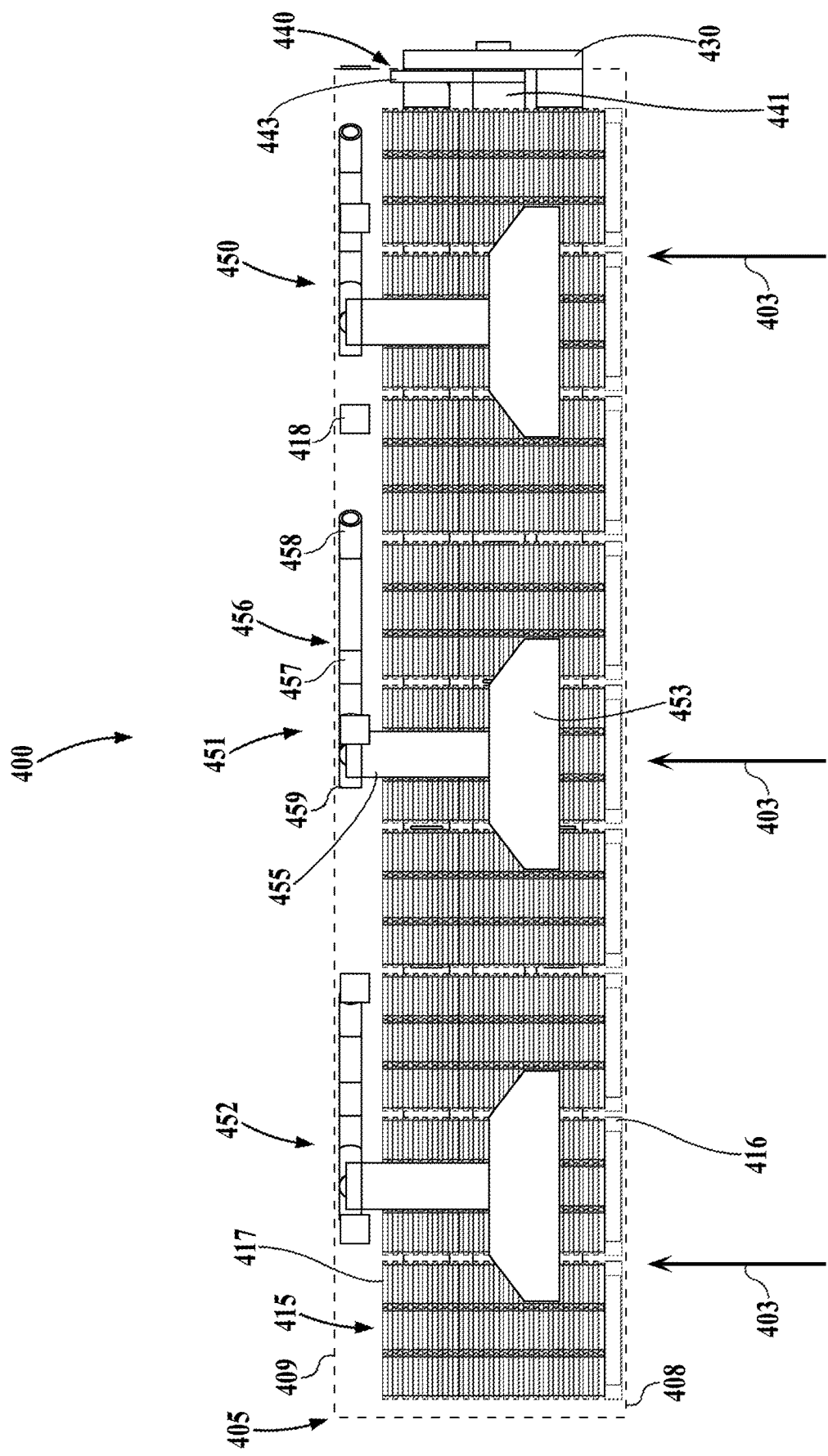
FIG. 4 illustrates a right-side view of a plant dehydration system in accordance with an embodiment of the present disclosure.

Referring to FIG. 4, a right-side view shows a plant dehydration system 400 in accordance with an embodiment of the present disclosure. The current view shows a right-side profile of the plant drying stacks 415 with portable platforms 416 loaded onto the drying chamber floor 408, highlighting the widthwise edges of the trays 417 lined up in sets of three per level. Recirculation subassembly 450 is installed nearest to the dry air intake portion of the supply duct subassembly 430, while subassemblies 451 and 452 are spaced evenly at the middle area and front area, respectively, of the housing structure 405. The full widths of the side return plenums 453 are also highlighted in this view. An exemplary embodiment provides plenums 453 which span the length of an entire drying stack 415—that stack of the second width wise row of two stacks in a modular segment of six, and approximately an additional third of the lengths of the stacks which precede and succeed the above-mentioned stack, or about twice the width of a drying tray 417. From an upper edge surface of each plenum 453, and having a shared vertical axis, the rectangular elbow stack duct 455 extends upward at a height of about half that of the housing 405, bending 90 degrees at a point near the ceiling 409 and extending toward the top recirculation duct 456. The stack duct 455 meets with the singular inlet portion 459 of the top duct 456. Each top recirculation fan 457 creates suction at the plenum 453, which pulls wetter air from the stacks 415 into the stack duct 455, then pushes it into the top recirculation duct 456 where it exits through the wye discharge 458. This promotes front-to-back airflow in an upper region of the chamber, complementing the back-to-front airflow promoted by the central recirculation duct 440, and contributing to a plurality of circulative air currents flowing within the drying chamber.

A back-end portion of the central recirculation duct 440 is shown in better detail. It further comprises a central trunk 441 and mixed air intake 443. As shown, the central trunk 441 (largely obscured by the plant drying stacks 415 in this view) meets the intake 443 at the back wall of the housing 405 and extends away from the back wall for nearly the entire length of the housing. The intake 443 is placed on or very near the back interior wall of the housing 405, with its terminal portion or inlet sitting at least 3 inches below lower edges of the back-end exhaust vents 418. With a generally uniform low temperature present within the drying chamber, humid air extracted from the plant drying stacks 415 via low ambient air pressure will always be lighter than dry air. Thus, as indicated by humid air motion arrows 403, the humid air is directed upward toward the ceiling 409 and outward via the circulative air currents, escaping through the exhaust vents 418. With time, both the less humid mixed air and the dry intake air should have the same humidity and temperature levels, indicating successful curing conditions for the organic material.

Figure 5:
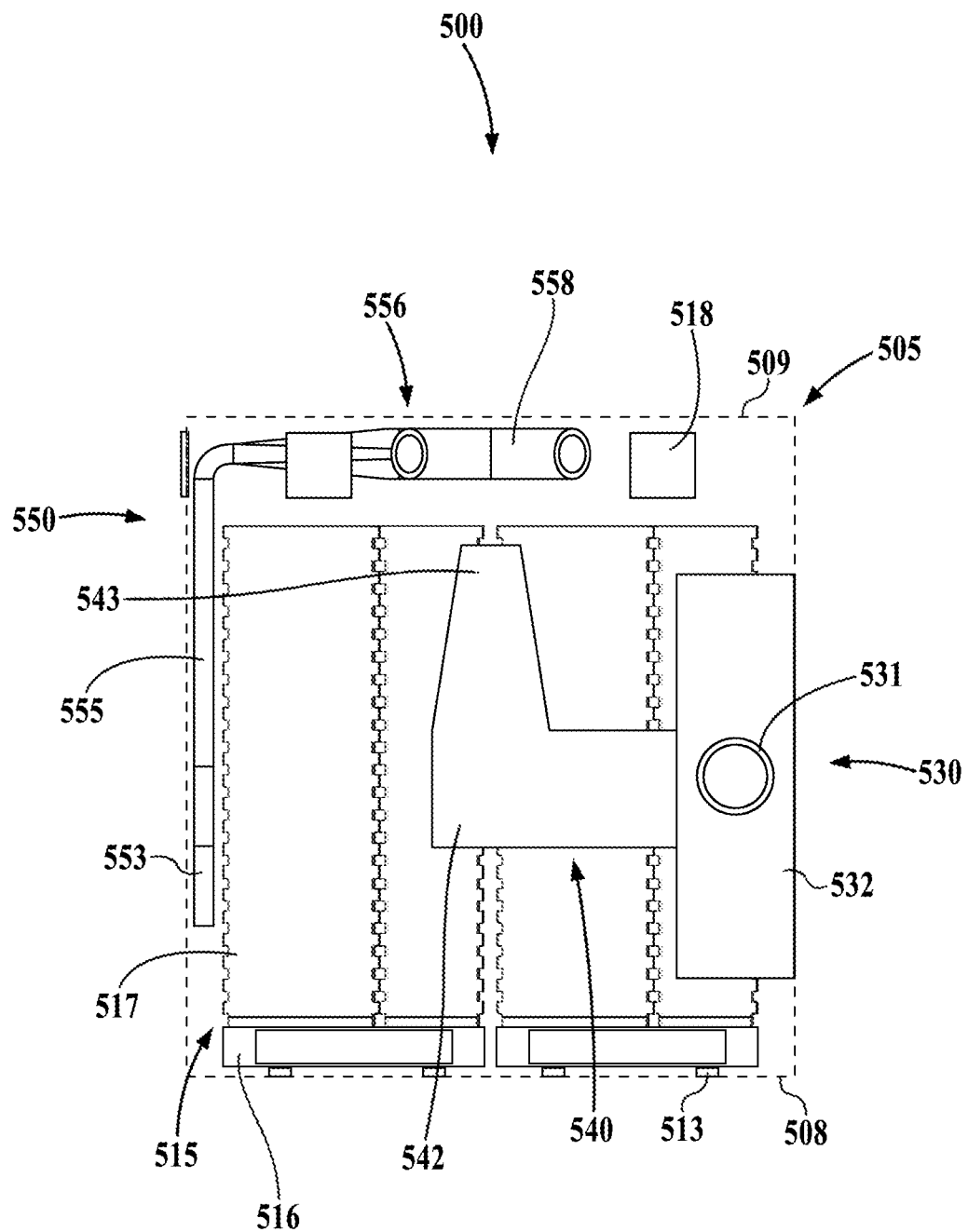
FIG. 5 illustrates a rear view of a plant dehydration system in accordance with an embodiment of the present disclosure.

Referring to FIG. 5, a rear view shows a plant dehydration system 500 in accordance with an embodiment of the present disclosure. The rear view of the plant drying stacks 515 more clearly shows their height-wise position in relation to the recirculation subassembly 550, central recirculation duct 540, and supply duct subassembly 530. The levels of stacked drying trays 517, sitting on the portable platform 516, are layered in a way that provides optimal ventilation for the drying organic material. In one example, bucked colas with sugar leaves are placed onto fully ventilated trays. Better ventilation results in better drying, as an optimal vapor pressure will permeate in-between the trays. The cola, or flower, is placed as a single layer onto the tray 517, allowing the ambient vapor pressure to affect the product from as many directions as possible. Generally, stems are important to the flower since they work as a water reservoir. However, with regard to fruit preservation and dehydration, it is important to remove the stem from the flower as soon as possible, since the stem does not add significant value to the cannabinoid, and also holds most of its free water. Plants with stems still attached can take twice as long to dry, since as the cola starts to dry, it keeps absorbing water from the stem—causing it to remain hydrated (see steps 1262-1266 of FIG. 12 for more detail on this process). The region above the stacks 515, approximately 1 foot in height from a top surface of the stacks to the ceiling 509, provides ample free space for the flow of humid air. Underneath the stacks 515, protruding upward from the floor 508 and making contact with bottom surfaces of the portable platforms 516, are the loading tracks 513. The rails of the loading tracks 513 slidably engage with the portable platforms 516, providing improved lengthwise mobility of the stacks 515 while placing them into predetermined positions within the drying chamber.

Recirculation subassembly 550, with side return plenum 553, elbow stack duct 555, and top recirculation duct 556, is shown in profile view, highlighting the 90-degree bend of the elbow stack duct near the ceiling 509. The symmetrical wye discharge 558 of the top duct 556 provides more optimal airflow than uneven ductwork, both within the top duct 556 and within the drying chamber. The supply duct subassembly 530, with vertical distributive duct 532 and dry air intake 531, is positioned so that the vertical duct 532 is generally nearer to the floor 508 than to the ceiling 509 of the housing structure 505. Its lower location optimizes the intake and dissemination of dry air within the drying chamber at the ideal parameters for humidity, temperature, and pressure. The current view also highlights the rear of the central recirculation duct 540. Its angular form extends laterally, nearly centrally from the vertical axis of the vertical distributive duct 532, reaching the widthwise center of the housing 505 and bending 90 degrees upward toward the ceiling 509 via an elbow transition 542. The mixed air intake 543 is well-positioned to "catch" the less humid air escaping from wye discharge 558 of recirculation subassembly 550, while the most humid air pushes against the exhaust vents 518 until they begin to open.

Figure 6:
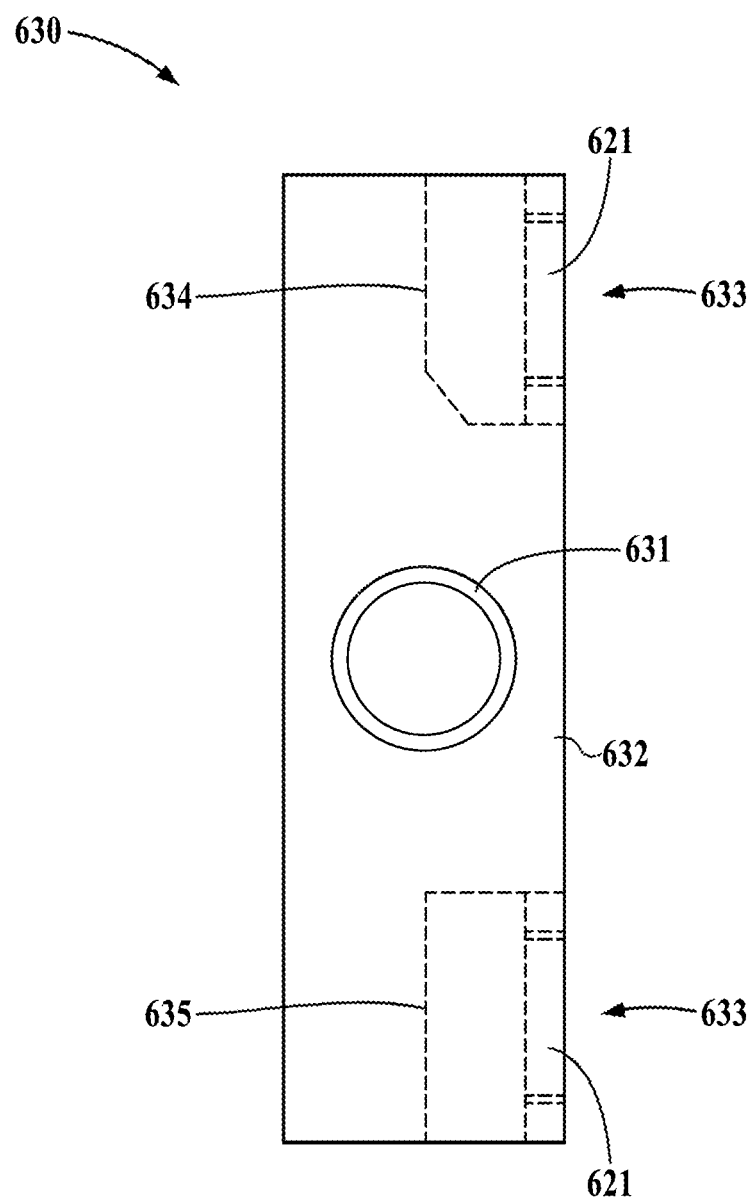
FIG. 6 illustrates a rear view of a lengthwise supply duct subassembly in accordance with an embodiment of the present disclosure.

Referring to FIG. 6, a rear view shows a lengthwise supply duct subassembly 630 in accordance with an embodiment of the present disclosure. The opening of the dry air intake 631 is shown in greater detail, with a typical circumferential thickness known in the art. An exemplary embodiment of the present invention provides an intake 631 with a diameter of about 11.75 inches. Dry air that enters the intake 631 travels upward and downward within the vertical distributive duct 632, entering the dual trunk structure 633 via openings found at the trunks' proximal ends. A profile view of the interior dual trunk structure 633 is shown with dashed lines, as the structure is not visible in this view. The upper and lower trunks 634 and 635, respectively, have generally rectangular contours, each having the same overall height and width dimensions, and each extending perpendicularly away from the upper and lower left corner regions of a vertical distributive duct 632 that is fully installed on a housing structure. For each trunk, the dashed lines show a larger and smaller rectangular portion. The larger rectangular portion corresponds to a wider trunk width at the meeting of each trunk and the vertical distributive duct 632, a width which tapers down gradually for about a foot along the length of each trunk. For each trunk, the smaller rectangular portions correspond to a trunk width of about 2.5 inches following the tapered portion. Air delivery slots 621 are shown running through these smaller widths of both the upper and lower trunks 634 and 635, respectively, and also correspond to the overall smaller widths of the trunks. An exemplary example of an air delivery slot 621 measures about 11 inches high and 1 inch wide.

Figure 7:
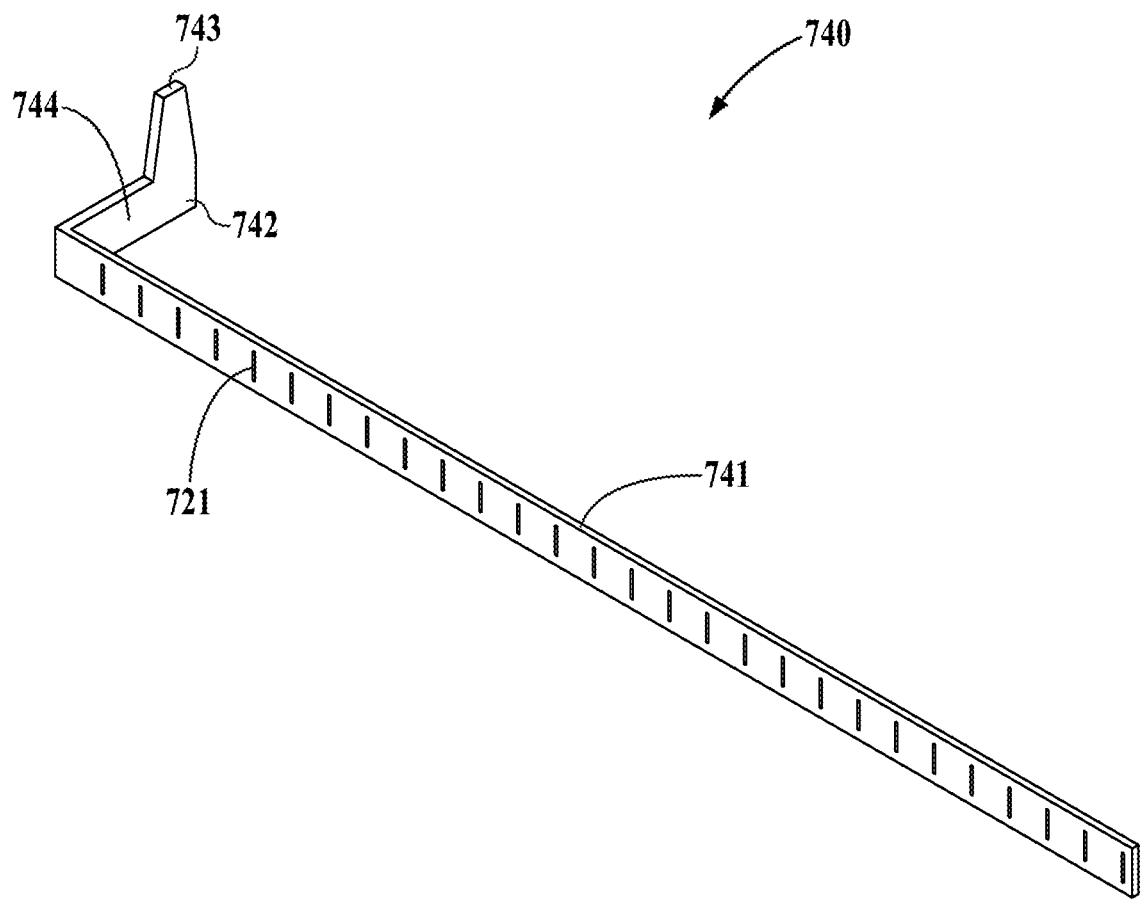
FIG. 7 illustrates a top left perspective view of a central recirculation duct in accordance with an embodiment of the present disclosure.

Referring to FIG. 7, a top left perspective view shows a central recirculation duct 740 in accordance with an embodiment of the present disclosure. The body of the long central trunk 741 dominates the majority of its form. In an exemplary embodiment, the trunk 741 measures about 452 inches long and 18 inches high, having an evenly distributed series of air delivery slots 721 running along its length and measuring about 11 inches high and 1 inch wide—as in the slot patterns found on the dual supply trunk (see dual trunk structure 633 of FIG. 6). The central trunk 741 has a 90-degree bend extending toward the mixed air intake 743 and forming the elbow transition 742, and another 90-degree bend extending upward, forming the duct wherein lies a central recirculation fan 744. An exemplary length dimension for the elbow 742 is about 52 inches; that of its thickness being about 4 inches—which is slightly wider than an exemplary central trunk which measures about 2.5 inches. The exemplary dimensions, shapes, and bends found in all of the present invention's ductwork provide optimal airflow with less pressure loss at key points. When the central recirculation duct 740 is installed into a fully operable plant dehydration system, activating the fan 744 causes suction at the mixed air intake 743, pulling the less humid air into the elbow transition 742 and forcing it along the entire length of the central trunk 741—where it gets pushed out through all of the slots 721.

Figure 8:
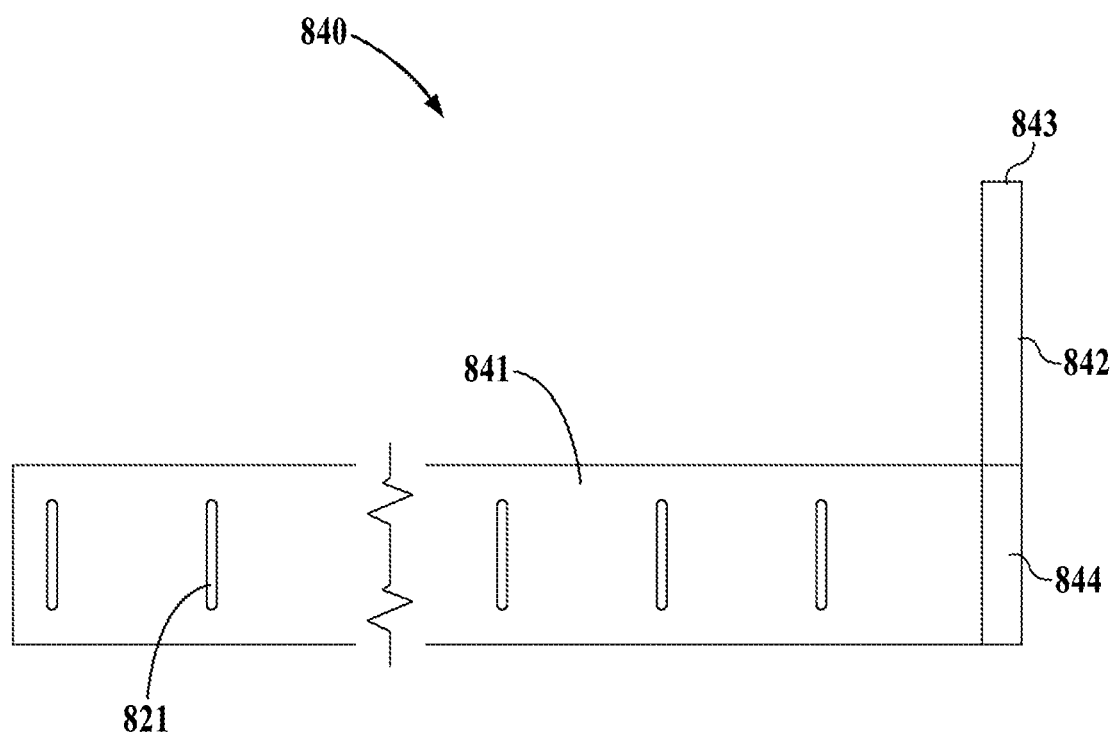
FIG. 8 illustrates a right-side view of a central recirculation duct in accordance with an embodiment of the present disclosure.

Referring to FIG. 8, a right-side view shows a central recirculation duct 840 in accordance with an embodiment of the present disclosure. The central recirculation duct 840 further comprises central trunk 841 with air delivery slots 821, elbow transition 842, central recirculation fan 844, and mixed air intake 843. An exemplary embodiment provides 28 air delivery slots 821 along the central trunk 841 for optimal air flow and mitigation of static pressure loss. The intake 843 exhibits an exemplary air flow SCFM (standard cubic feet per minute) of approximately 800.

Figure 9:
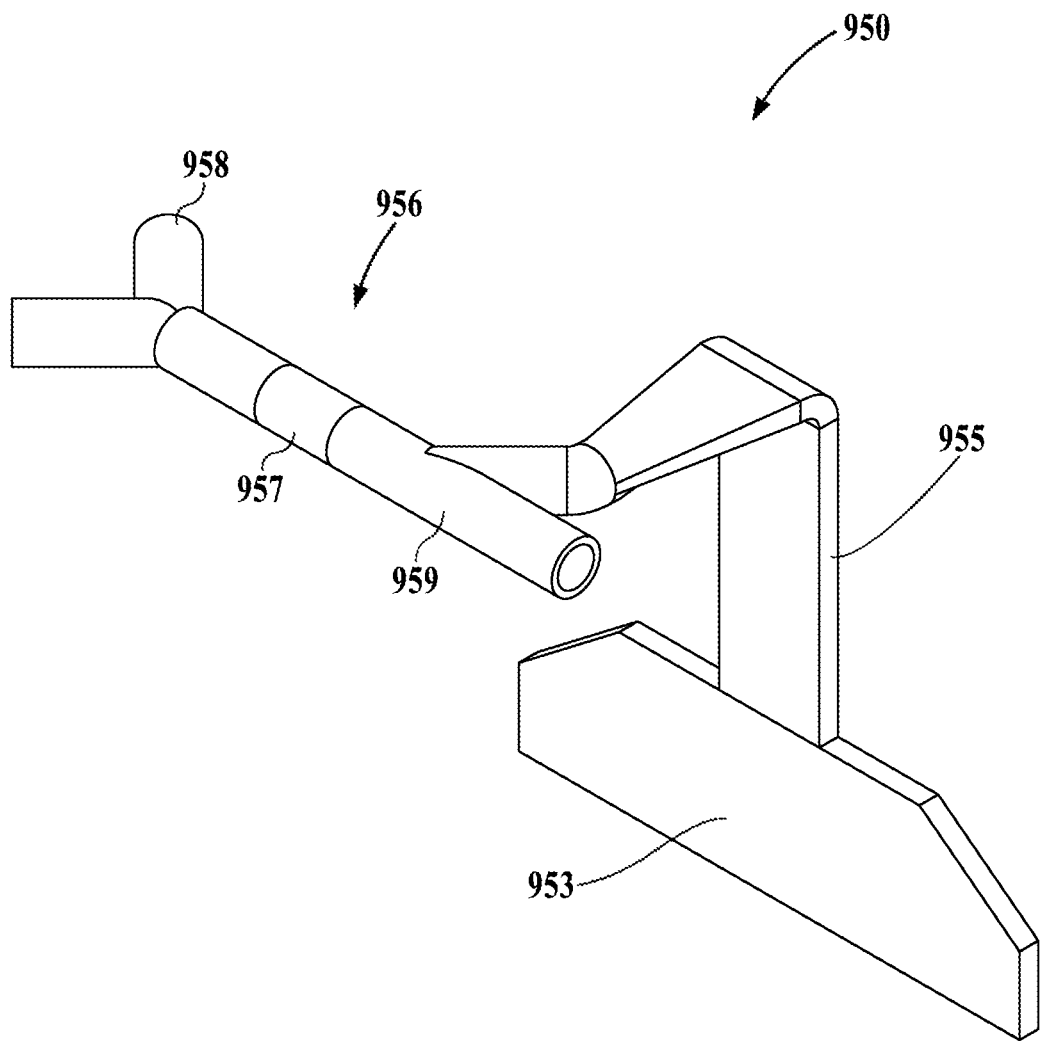
FIG. 9 illustrates a top left perspective view of a recirculation subassembly in accordance with an embodiment of the present disclosure.

Referring to FIG. 9, a top left perspective view shows a recirculation subassembly 950 in accordance with an embodiment of the present disclosure. The recirculation subassembly 950 shown further comprises side return plenum 953, elbow stack duct 955, and top recirculation duct 956 with singular inlet portion 959, top recirculation fan 957, and symmetrical wye discharge 958. The wye discharge has the shorter proximal trunk portion mentioned above. An exemplary embodiment provides a wye discharge with shorter trunk portion measuring approximately 16 inches long, while the longer version measures approximately 32 inches long. An exemplary inlet portion 959 includes a louver to limit the intake of air, providing proper suction and air flow upward through the elbow stack duct 955. As well, the cylindrical components forming the top recirculation duct 956 have circumferential edges that lie generally flush with one another, the duct generally having an exemplary diameter of approximately 7.75 inches to match the diameter of the inserted fan. The full height of an exemplary subassembly 950 measures approximately 76 inches, while its width measures approximately 50 inches. The top recirculation duct 956 also exhibits an exemplary SCFM of approximately 800, with suction at the plenum 953 occurring at approximately 470 SCFM. The plenum 953 can utilize slot-style openings to receive air.

Figure 10:
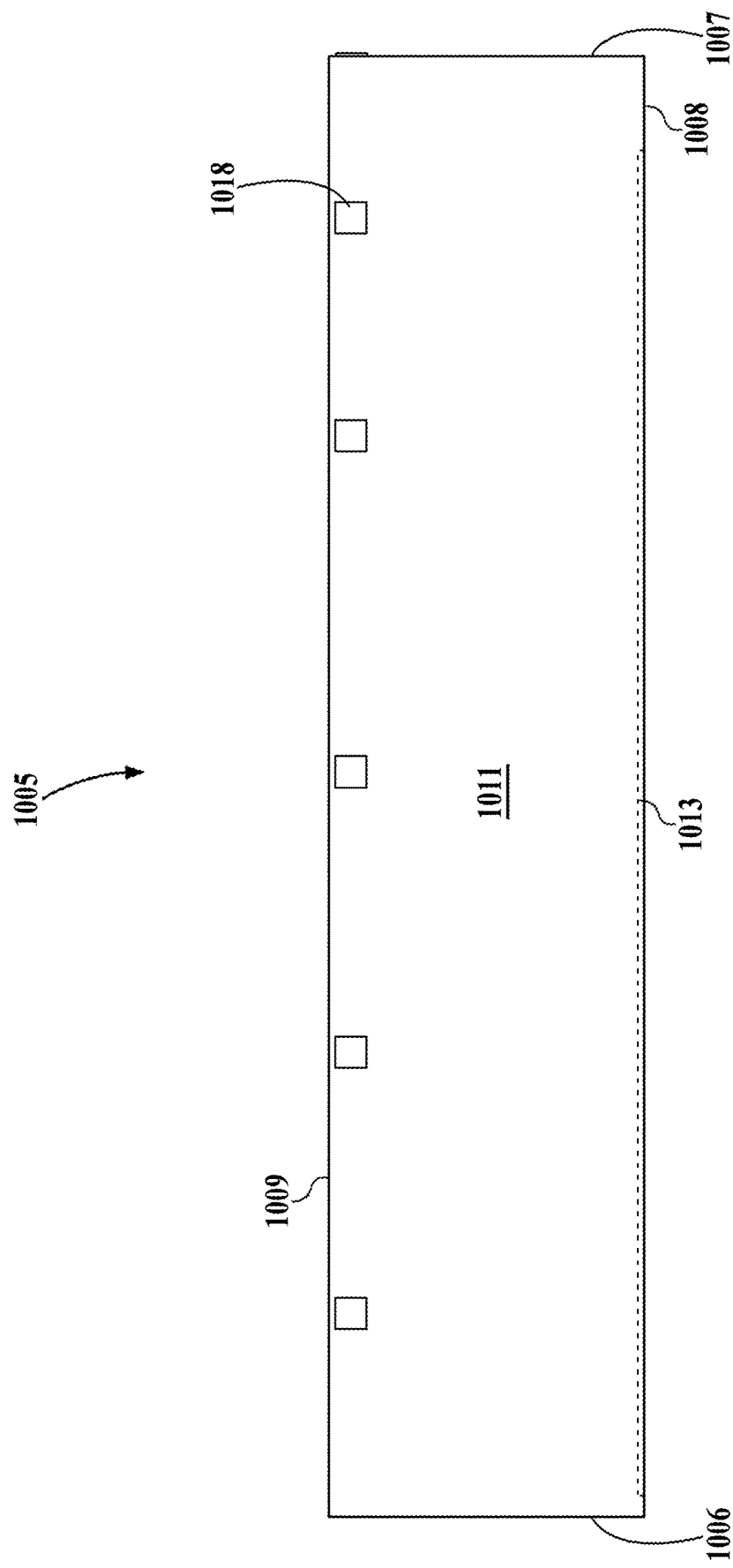
FIG. 10 illustrates a right-side view of a housing structure for a plant dehydration system in accordance with an embodiment of the present disclosure.

Referring to FIG. 10, a right-side view shows the exterior of the housing structure 1005 for a plant dehydration system in accordance with an embodiment of the present disclosure. The housing structure 1005 further comprises ceiling 1009, floor 1008, front wall 1006, back wall 1007, right-side wall 1011, exhaust vents 1018, and loading tracks 1013 (shown with dashed lines, as they lie within the housing structure). An exemplary housing structure 1005 provides a modified, highly durable and sturdy shipping container, which offers a number of advantages like portability, scalability, and loading efficiency. The shipping container with interior contents can be transported to different locations as needed. Considering the drying of hemp plants in particular, with the time-sensitive nature of post-harvest activities and drying methods, the above features make this exemplary housing structure highly compatible with needs that are present in the industry.

Figure 11:
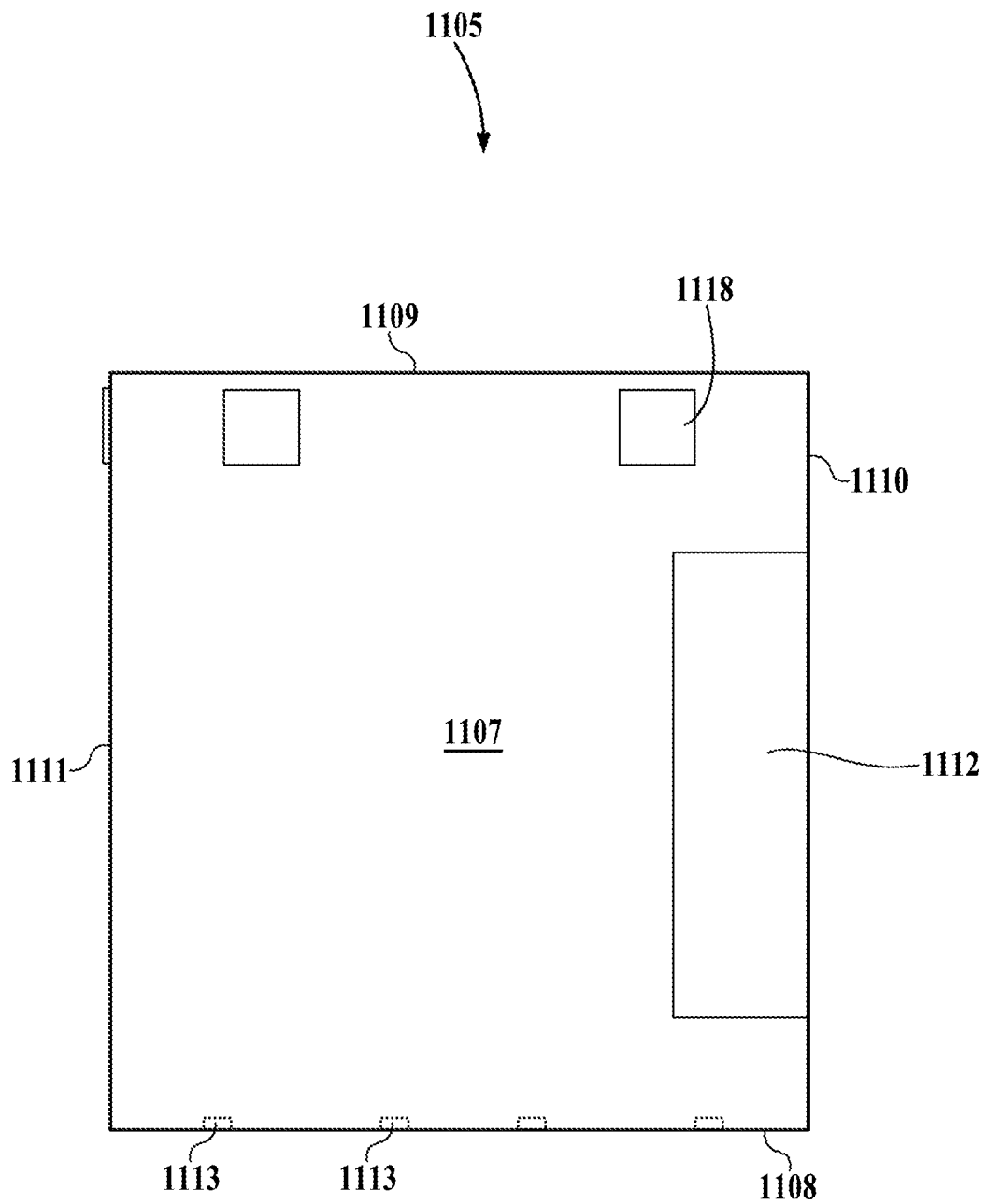
FIG. 11 illustrates a rear view of a housing structure for a plant dehydration system in accordance with an embodiment of the present disclosure.

Referring to FIG. 11, a rear view shows the exterior of the housing structure 1105 for a plant dehydration system in accordance with an embodiment of the present disclosure. This view highlights a supply duct inlet 1112 cut through the back wall 1107 of the housing structure 1105, adjacent to the left-side wall 1110, and corresponding with the size and dimensions of inserted ductwork. The housing structure 1105, with ceiling 1109, floor 1108, right-side wall 1111, and loading tracks 1113 (again shown with dashed lines) provides the upper series of exhaust vents 1118 with barometric relief dampers that create and maintain the pressure needed to cause low vapor pressure in all corners of the drying chamber. Yet, the minimal pressure created is not high enough to significantly increase the temperature of the dried organic materials. The present invention bypasses any undesirable consequences of the Gay-Lussac law governing the proportional pressure-temperature relationship, wherein higher pressure equals higher temperature. Using a lower temperature system, negative air vapor pressure is maintained to draw out moisture from goods.

Figure 12:
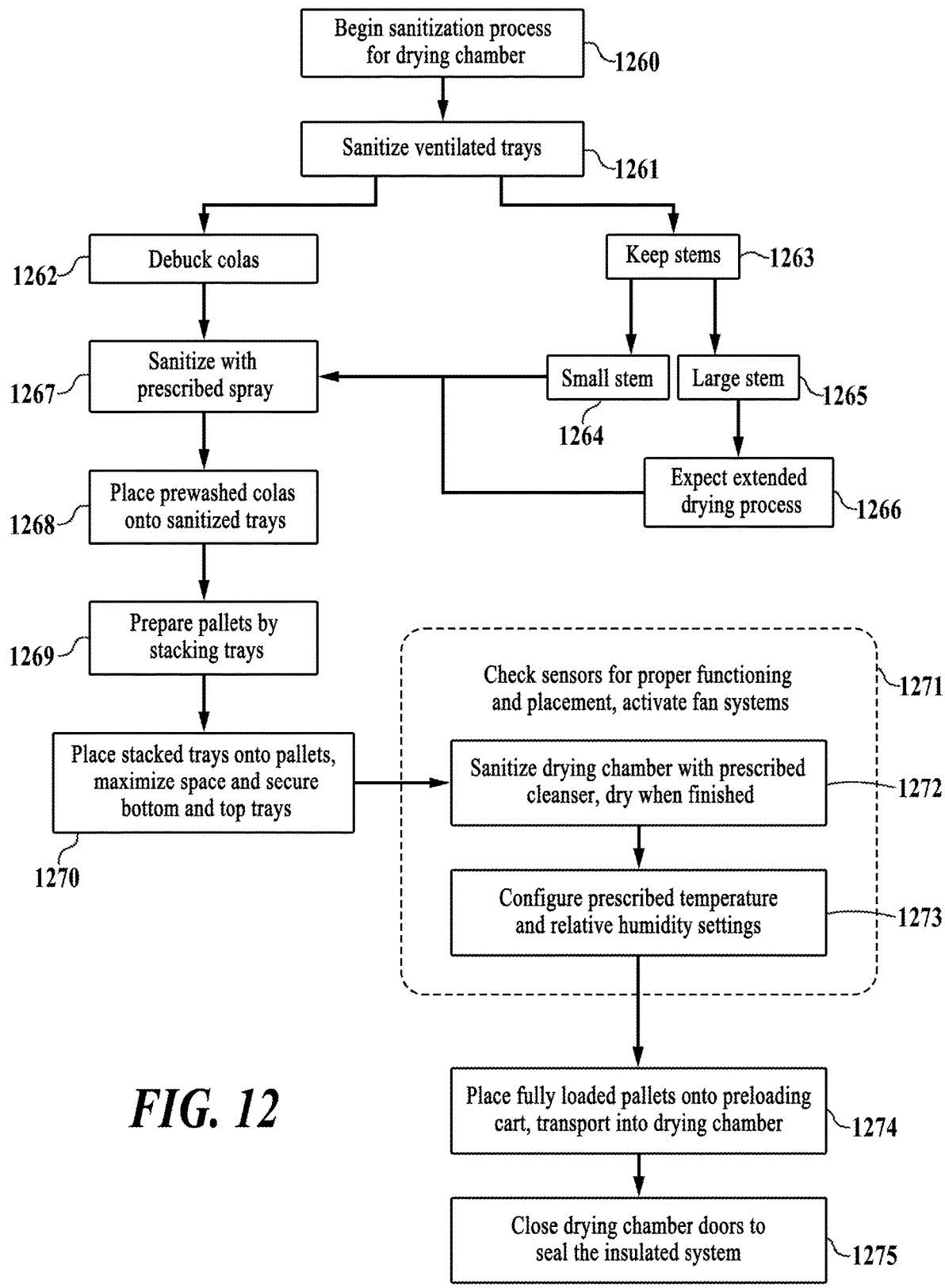
FIG. 12 illustrates a process for sanitary preparation of plant drying stacks within a housing structure in accordance with an embodiment of the present disclosure.

Referring to FIG. 12, a process for sanitary preparation of plant drying stacks within a housing structure is shown in accordance with an embodiment of the present disclosure. The following preparation and dehydration processes focus primarily on the previously mentioned cannabis or hemp flower, or cola/buds, of the cannabaceae family. Initial step 1260 indicates that an operator begins the sanitation process. The operator sanitizes the ventilated trays, assuring that they are free from bacteria, as indicated by step 1261. Next, the operator debucks the colas, as indicated by step 1262, which involves removing the colas from their attached stems. If, however, the operator decides to keep the stems, as indicated by step 1263, they should make an effort to keep the smallest stems, as indicated by step 1264, then move on to the sanitization of the colas—shown by step 1267. If the operator does indeed keep the larger stems, shown by step 1265, they must expect an extended drying process, and can plan and prepare for the different time frame as necessary, as indicated by step 1266. Larger stems are still sanitized via step 1267, which includes spraying the colas with a mix of water and organic sanitizer to remove any volatile material that could generate any mold or bacteria. Following this sanitization with the prescribed spray, the operator places the bucked and prewashed colas onto the sanitized trays, as indicated by step 1268. The colas are placed onto the trays in single layers in order to maximize space. Next, the operator prepares pallets by stacking the trays, as indicated by step 1269. Using stackable trays allows a continuous, efficient loading process, and saves on carts. The operator then places the stacked trays onto the pallets, maximizing available space, as indicated by step 1270. Placing five vented trays, each with dimensions of 24 by 16 by 4 inches, will occupy the entire top surface of each pallet (see tray orientation technique described above in FIG. 2). The bottom tray should be attached to the bottom pallet to avoid movement, while the top tray should be latched to prevent it from falling.

The operator must then sanitize the drying chamber with the prescribed cleanser of soap and antibacterial solution to ensure a food grade environment, and dry it when finished, as indicated by step 1272. Next, the interior temperature is lowered to at least 60 degrees Fahrenheit and the relative humidity adjusted to at least 20% by introducing dry air within the chamber, as indicated by steps 1271 (dashed box), wherein the fan systems include the dry air supply, the internal circulating fan system which facilitates air movement to help the chamber reach an internal moisture and temperature equilibrium, and the recirculating fan system which ensures that no humidity is left inside of the ducts. As also indicated by concurrent steps 1271, the operator must check system sensors, making sure they are working properly and placed in the proper, readable location. The operator then places the fully loaded pallets onto the preloading cart using a forklift, and rolls them into the drying container, as indicated by step 1274. A 40-foot drying chamber can hold two lengthwise rows of 9 pallets, each pallet measuring 48 inches long by 40 inches wide. In this embodiment, each pallet can hold 22 stacked trays, for a total of 110 trays per pallet, and 1980 trays per shipping container. Overall, one shipping container provides about 5,280 square feet of product storage. Trays can be stacked to fit less trays per pallet, or nested to fit more pallets, and the process will work either way. Finally, once all of the pallets are inside, the chamber doors are closed with the dry intake air and other fan systems still running (sealing the insulated system), as indicated by step 1275.

Figure 13:
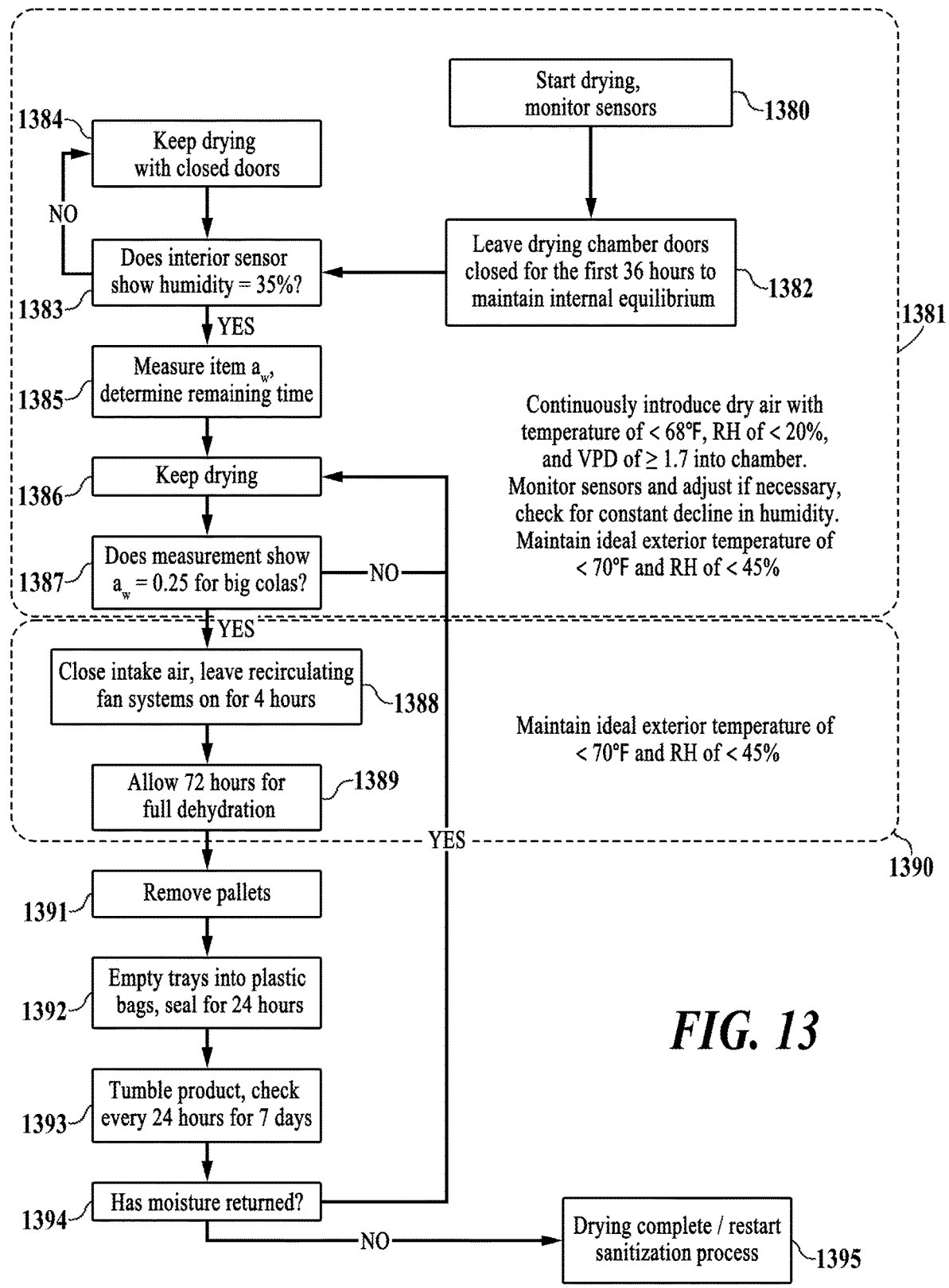
FIG. 13 illustrates a process for dehydrating plants in accordance with an embodiment of the present disclosure.

Referring to FIG. 13, a process for dehydrating hemp plants is shown in accordance with an embodiment of the present disclosure. Continuing from the previous process described above for FIG. 12, the operator starts drying, maintaining the above-mentioned flow of dry intake air from the desiccant into the sealed drying chamber and monitoring sensors, as indicated by step 1380. As indicated by concurrent steps 1381 (a dashed box), the operator must continuously pump in dry air which has a temperature of less than 68 degrees Fahrenheit, a relative humidity of less than 20%, and a vapor pressure deficit of greater than or equal to 1.7 kPa. The air flows in at an average CFM in the range of 1,300 to 1,650 CFM. In a 40-foot container having 2,560 cubic feet, there are a total of 38.67 air exchanges per hour. Having exhaust vents with barometric relief dampers or louvers creates a minimal internal pressure that guarantees that dry air is reaching all corners of the drying chamber. Once humid air leaves the chamber, it is not reintroduced. Moreover, humid air that escapes the drying chamber does not travel near the desiccant unit or cause any harm to the desiccant wheel. The system is configured to achieve a VPD of 1.4 kPa or higher within the first couple hours of drying. The recirculating fan system ensures that newly introduced dry air mixes with the moist air currently present within the chamber, creating a balanced air mixture where needed, and preventing the wet colas from receiving too much dry air that could harm their outer surface. With the passage of time, the recirculating air assumes temperature and moisture levels that are equivalent to those of the newly introduced air. This allows the internal free water found within the colas to reach a state of equilibrium, promoting uniform drying throughout the colas while maintaining their bound water. Furthermore, this results in a denser and heavier final product for the vendor.

Throughout the drying process, as also indicated by concurrent steps 1381, the operator must monitor system sensors and adjust any drying settings if necessary. The sensors measure air moisture rather than cola moisture, but a comparative measurement taken between dry intake air and escaping humid air can provide an accurate reading for the active rate of moisture loss from the colas. The drying chamber temperature of below 70 degrees Fahrenheit prevents monoterpenes from evaporating, preserving essential cannabinoids in the final product, and having the added benefit of releasing less odors into the air as traditional hanging methods tend to do. The operator must also ensure that external conditions beyond the drying chamber are continuously favorable, including having an ambient temperature of less than 70 degrees Fahrenheit, and a relative humidity of less than 45%, as further indicated by concurrent steps 1381. As drying continues, step 1382 indicates that the drying chamber doors should be monitored and remain closed for the first 36 hours in order to maintain the internal pressure equilibrium that is created by the system.

As indicated by step 1383, once sensors show that the internal humidity level has reached 35%, the operator can measure the water activity levels found in the colas by sampling different trays to verify the properly dried state of the colas, as indicated by step 1385. If sensors do not show a 35% humidity level, the operator can return to continued drying, as indicated by step 1384. Continuing with step 1385, the operator can then determine how much time is needed for small colas and large colas to reach respective water activity levels of 0.45 and 0.25, then continue drying as indicated by step 1386. In one embodiment, small colas are defined as being below a median cola size, and large colas are defined as being above the median cola size.

Following the period of continued drying noted by step 1386, and upon remeasuring water activity within large colas and finding the proper value of 0.25, shown by step 1387, the operator can proceed with step 1388, shutting off the dry intake air and leaving on the recirculating fan system for 4 more hours. If the proper water value is not yet achieved, the operator should return to step 1386 for more drying. Step 1388 allows the large and small colas to balance within a controlled environment, giving them time to stabilize and cure ideally within 72 hours, as indicated by step 1389. Concurrent steps 1390 indicate the continued maintenance of external conditions during the drying periods noted above by steps 1388-1389, including keeping the external temperature below 70 degrees Fahrenheit and the external relative humidity below 45%. Extreme external temperatures might require longer or shorter drying times.

With fully dry colas, the operator can continue with step 1391, and remove the pallets using the preloading cart. Trays should be emptied into plastic bags using the offloading tray cart, and sealed in boxes for a period of 24 hours, as indicated by step 1392. After the 24-hour period, the product should be tumbled and checked every 24 hours for the first 7 days, as indicated by step 1393. During or after that time, if moisture has returned to the bag due to atmospheric conditions, as noted by step 1394, the boxes can be placed back inside of the drying chamber for a period of 24 hours to remove any moisture that the flowers may have gained, revisiting step 1386 in some capacity, but not necessarily repeating all subsequent steps again. If no moisture is found again on the product, the dehydration process is complete, and sanitization procedures can occur once again, as indicated by step 1395. Empty trays are ready to be washed and sanitized on the tray washer machine and the empty shipping container is ready to be washed and sanitized for the next load. The full process takes 72 hours depending on the Cola size. A group of 3 drying units is set so that there is always one container being loaded every day. As well, the group of 3 drying units can share one desiccant unit that can produce 5,000 CFM.

Many variations may be made to the embodiments described herein. All variations are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

There may be many other ways to implement the disclosed embodiments. Various functions and elements described herein may be partitioned differently from those shown without departing from the scope of the disclosed embodiments. Various modifications to these implementations may be readily apparent to those skilled in the art, and generic principles defined herein may be applied to other implementations. Thus, many changes and modifications may be made to the disclosed embodiments, by one having ordinary skill in the art, without departing from the scope of the disclosed embodiments. For instance, different numbers of a given element or module may be employed, a different type or types of a given element or module may be employed, a given element or module may be added, or a given element or module may be omitted.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The invention claimed is:
1. A dehydration system for organic material, comprising:
(a) a housing structure having an interior chamber formed by front, back, right-side and left-side walls, a floor, and a ceiling, wherein each of the walls, floor, and ceiling has an interior surface that faces the chamber and an exterior surface, and wherein each of the walls has an upper region;

(b) a supply duct comprising a vertical distributive duct, a dual trunk structure with upper and lower trunks, and a dry air intake, wherein the upper and lower trunks extend away from the vertical distributive duct and the interior surface of the back wall and toward the interior surface of the front wall, wherein the dry air intake extends away from the vertical distributive duct and away from the dual trunk structure, wherein the supply duct is configured to force dry air into the interior chamber of the housing structure, wherein the dry air enters the supply duct through the dry air intake, wherein the vertical distributive duct is configured to distribute the dry air to the upper and lower trunks, and wherein the dual trunk structure is configured to release the dry air into the interior chamber of the housing structure;

(c) a central recirculation duct comprising a central trunk with a mixed air intake extension, wherein the central recirculation duct is configured to recirculate interior air contained in the chamber, wherein the interior air enters into the central trunk through the mixed air intake, and wherein the central trunk is configured to release the interior air back into the interior chamber;

(d) a plurality of side recirculation ducts each comprising a return plenum extending downward from a top recirculation duct, wherein the side recirculation ducts are positioned opposite the dual trunk structure and central trunk, wherein the side recirculation ducts are configured to recirculate interior air contained in the chamber, and wherein the interior air enters into the side recirculation ducts through the return plenums and is pushed upward and outward through the top recirculation ducts and back into the interior chamber; and (e) a plurality of portable platforms positioned inside of the interior chamber and configured to hold organic material.

2. The dehydration system of claim 1, wherein the inflow of dry air into the interior chamber establishes a temperature of below 70 degrees Fahrenheit and a relative humidity level of less than 30% in air surrounding the organic material, wherein the relative humidity level causes a vapor pressure deficit in the air, wherein the vapor pressure deficit causes free water to escape from the organic material while leaving bound water intact, the escaped free water mixing with the dry air in the interior chamber.

3. The dehydration system of claim 1, wherein the dry air and recirculated air moves horizontally over the organic material, from the interior front wall to the interior back wall, and in a circular path throughout the interior chamber, and wherein the most humid air continually rises toward the ceiling of the interior chamber.

4. The dehydration system of claim 1, wherein the vapor pressure deficit is within the range of 1.4 kPa to 1.7 kPa.

5. The dehydration system of claim 1, wherein the interior chamber has a plurality of exhaust vents positioned in the upper region of its walls, wherein the exhaust vents are configured to be in a closed position when the vapor pressure deficit is below the range of 1.4 kPa to 1.7 kPa and configured to be in an open position that releases the most humid air when the vapor pressure deficit is within the range of 1.4 kPa to 1.7 kPa.

6. The dehydration system of claim 5, wherein the exhaust vents are under tension using barometric relief dampers, wherein the dry air is pushed through air delivery slots found on the dual trunk structure, wherein the interior air is pushed through air delivery slots found on the central trunk, wherein the dry air flowing into the interior chamber has a vapor pressure deficit value of about 1.7 kPa, a relative humidity value of less than 20%, and a temperature of less than 68 degrees Fahrenheit, and wherein the air within the chamber is exchanged at least 30 times per hour.

7. The dehydration system of claim 1, wherein the organic material comprises bucked cannabaceae colas placed in trays that are stacked upon the portable platforms, and wherein the housing structure further comprises loading tracks on the interior surface of the floor that are configured to engage with the portable platforms.

8. A portable system for drying hemp plants comprising:
(a) a shipping container having an interior drying chamber formed by front, back, right-side and left-side walls, a floor, and a ceiling, wherein each of the walls, floor, and ceiling has an interior surface that faces the chamber and an exterior surface, wherein each wall has an upper region, wherein the back wall has a supply duct inlet running through it and positioned adjacent to the left-side wall, wherein the shipping container comprises a plurality of exhaust vents in the upper region of the right-side wall, a plurality of exhaust vents in the upper region of the back wall, and loading tracks running along the length of the floor, the loading tracks configured to receive a plurality of pallets having a plurality of trays for holding the hemp plants;

(b) a supply duct comprising a vertical distributive duct having a flat back surface with central region and flat front surface with upper and lower left regions corresponding with the left side of the shipping container, the front surface entering the drying chamber through the supply duct inlet of the back wall, a dual trunk structure located within the drying chamber and comprising upper and lower trunks each having proximal openings that run through the upper and lower left regions of the vertical distributive duct and each including a plurality of air delivery slots, and a dry air intake, wherein the vertical distributive duct is positioned on the exterior surface of the back wall, wherein the upper and lower trunks extend perpendicularly away from the front surface of the vertical distributive duct and toward the front wall along the interior left-side wall, wherein the dry air intake extends perpendicularly away from the back surface of the vertical distributive duct at a central region, wherein the supply duct includes a fan to force dry air into the drying chamber, wherein the dry air enters the supply duct through the dry air intake, wherein the vertical distributive duct is configured to distribute the dry air to the upper and lower trunks through their proximal openings, and wherein the dual trunk structure releases the dry air into the drying chamber through the air delivery slots;

(c) a central recirculation duct comprising a central trunk, elbow transition, and mixed air intake, wherein the central trunk runs in-between the upper and lower trunks of the dual trunk structure and includes a plurality of air delivery slots, wherein the elbow transition extends away from the central trunk and upward toward the ceiling to terminate in the mixed air intake, wherein the central recirculation duct includes a fan to recirculate interior air contained in the chamber, wherein the interior air enters first through the mixed air intake then travels into the central trunk, and wherein the central trunk releases the interior air back into the chamber through the air delivery slots; and (d) a plurality of side recirculation ducts each comprising a return plenum, an elbow duct, and a top recirculation duct, the elbow ducts extending upward from the return plenums and laterally toward the top recirculation ducts which are positioned on the interior ceiling with the return plenums positioned along the interior right-side wall, wherein each top recirculation duct further comprises a singular inlet portion at an intake end and a symmetrical wye discharge at an output end, wherein the side recirculation ducts each include a fan to recirculate interior air contained in the chamber, and wherein the interior air enters into the side recirculation ducts through the return plenums and is pushed upward through the elbow ducts and outward through the wye discharges of the top recirculation ducts and back into the interior chamber.

9. The portable system of claim 8, wherein the inflow of dry air into the drying chamber provides a temperature of below 70 degrees Fahrenheit and a relative humidity level of less than 30% in the air surrounding the hemp plants, wherein the relative humidity level provides a vapor pressure deficit in the air that causes free water to escape from the hemp plants while leaving bound water intact, the escaped free water mixing with the dry air in the drying chamber.

10. The portable system of claim 8, wherein air currents in the drying chamber move horizontally in a circular path through the hemp plants, from the interior front wall to the interior back wall, wherein the most humid air continually rises toward the ceiling of the interior chamber, and wherein the exhaust vents are configured to open and close based on the pressure within the chamber.

11. The portable system of claim 8, wherein the shipping container and has 5 exhaust vents in the right-side wall and 2 exhaust vents in the back wall, the vents using barometric relief dampers to open and close under tension, wherein the dual trunk structure has upper and lower trunks with identical lengths, widths, and heights, wherein the air delivery slots are evenly spaced along the length of the dual trunk structure, wherein the central recirculation duct has the central trunk with the mixed air intake positioned at the interior back wall at least 3 inches below both exhaust vents, and air delivery slots that are evenly spaced along the length of the central trunk, and wherein 3 side recirculation ducts are evenly spaced relative to one another between the interior back and front walls, the middle duct having a top recirculation duct with a greater length than that of the other two side recirculation ducts.

12. The portable system of claim 8, wherein the hemp includes bucked cannabaceae colas, wherein the vapor pressure deficit is at least 1.4 kPa, and wherein the dry air flows into the drying chamber at between 1,300 and 1,700 CFM, has a vapor pressure deficit of at least 1.7 kPa, a relative humidity of less than 20%, and a temperature of less than 68 degrees Fahrenheit.

13. The portable system of claim 8, wherein 18 pallets are each stacked with 22 levels of trays, each level comprising 5 trays, the stacked pallets being positioned into 2 rows of 9 stacks each within the drying chamber, wherein the loading tracks comprise two pairs of rails, each pair of rails corresponding to a row of 9 stacks, the loading tracks being configured to facilitate the loading, unloading, and positioning of the stacks, and wherein the shipping container is configured for transport to different locations.

14. The portable system of claim 13, wherein there are 6 stacked pallets for each side recirculation duct.

15. A method of dehydrating cannabaceae plants comprising:
    (a) Sanitizing ventilated trays;
    (b) Debucking cannabaceae colas;
    (c) Sanitizing the colas;
    (d) Placing the colas onto the trays;
    (e) Stacking the trays;
    (f) Placing the stacks onto pallets;
    (g) Sanitizing a drying chamber;
    (h) Drying the chamber, activating fan systems, and checking temperature and relative humidity sensors for proper functioning and placement;
    (i) Adjusting temperature and relative humidity within the drying chamber to 60 degrees Fahrenheit and 20%, respectively;
    (j) Transporting the loaded pallets into the drying chamber;
    (k) Closing the doors to the drying chamber to seal the system;
    (l) Introducing a continuous supply of dry intake air into the drying chamber using a desiccant unit and monitoring the sensors;
    (m) Measuring a relative humidity level of 35% within the drying chamber;
    (n) Measuring the water activity levels of small and large colas, and determining a time frame in which the levels will reach 0.45 and 0.25, respectively;
    (o) Continuing drying;
    (p) Measuring a water activity level of 0.25 in large colas;
    (q) Shutting off the supply of dry air, and leaving the fan systems on for 4 more hours;
    (r) Removing the loaded pallets of dry colas from the drying chamber;
    (s) Emptying the colas from the trays into plastic bags and sealing the bags in boxes;
    (t) Tumbling and checking the colas;
    (u) If moisture has returned within the bag, placing the colas back in the drying chamber; and
    (v) If drying is complete, restarting the sanitization process.

16. The method of claim 15, wherein the drying chamber includes exhaust vents under tension with barometric relief dampers, wherein the vents create a minimal pressure within the chamber that causes the dry air to permeate all corners of the chamber, wherein free water within the colas is substantially removed leaving bound water substantially intact, and wherein humid air leaves the chamber through the vents and is not reintroduced into the drying chamber or near the desiccant unit.

17. The method of claim 15, wherein the supply of dry air has a temperature of less than 68 degrees Fahrenheit, a relative humidity of less than 20%, and a vapor pressure deficit of greater than or equal to 1.7 kPa, and wherein a vapor pressure deficit of greater than 1.4 kPa is created within the drying chamber within 5 hours of drying.

18. The method of claim 15, wherein the drying chamber is the interior of a shipping container that is 40 feet in length, wherein the loaded pallets are placed into 2 lengthwise rows of 9, wherein each pallet holds 22 levels of stacked trays, wherein the supply of dry air has a CFM of between 1,300 and 1,700, and wherein there are at least 30 air exchanges per hour within the drying chamber.

19. The method of claim 15, wherein the drying chamber doors are closed for the first 36 hours, wherein an external temperature and relative humidity outside of the drying chamber are maintained below 70 degrees Fahrenheit and 45% relative humidity for 72 hours, wherein full curing is completed after 72 hours, wherein the bagged colas remain in the sealed boxes for a period of 24 hours and subsequently tumbled and checked every 24 hours for a period of 7 days, and wherein the colas are placed back into the drying chamber for a period of 24 hours if moisture has returned to the bag within the 7 day period.

20. The method of claim 15, wherein a set of 3 drying units share one desiccant unit that is configured to provide up to 5,000 CFM of dry air.

* * * * *